(12) United States Patent
Robertson et al.

(10) Patent No.: US 7,400,596 B1
(45) Date of Patent: Jul. 15, 2008

(54) DYNAMIC, MULTICAST ROUTING USING A QUALITY OF SERVICE MANAGER

(75) Inventors: Richard L. Robertson, Cedar Rapids, IA (US); Kelli A. Hoback, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 549 days.

(21) Appl. No.: 11/205,453

(22) Filed: Aug. 17, 2005

(51) Int. Cl.
*H04Q 7/24* (2006.01)

(52) U.S. Cl. .................. 370/312; 455/518; 455/519

(58) Field of Classification Search .............. None
See application file for complete search history.

(56) References Cited

U.S. PATENT DOCUMENTS

| | | | |
|---|---|---|---|
| 5,412,654 | A | 5/1995 | Perkins |
| 6,845,250 | B1 | 1/2005 | Ramalingam |
| 6,850,987 | B1 | 2/2005 | McCanne et al. |
| 6,917,985 | B2 | 7/2005 | Madruga et al. |
| 7,061,880 | B2 * | 6/2006 | Basilier ............. 370/312 |
| 2004/0064506 | A1 * | 4/2004 | Ohara ............... 709/204 |

OTHER PUBLICATIONS

J. Jetcheva and D. Johnson, "A Performance Comparison of On-Demand Multicast Routing Protocols for Ad Hoc Networks", School of Computer Science, Computer Science Department, Carnegie Mellon University, Pittsburgh, PA; Dec. 15, 2004.

J. Peltotalo, M. Borst, S. Peltotalo, "Multicast Routing in Ad Hoc Networks", 8303900 Advanced Topics in Broadband Networks, Nov. 26, 2004.

Page print of http://wiki.uni.lu/secan-lab/Highly+Dynamic+Destination-Sequenced+Distance-Vector+Routing.html. pp. 1-4, dated Aug. 2, 2005.

Page print of http://wiki.uni.lu/secan-lab/Cluster-Head+Gateway+Switch+Routing+Protocol.html pp. 1-3, dated Aug. 2, 2005.

A. Ramalingam, S. Subramani, and K. Perumalsamy, "Associativity Based Cluster Formation and Cluster Management in Ad Hoc Networks", School of Comupter Science and Engineering, Anna Unversity, Chennai, India.

(Continued)

*Primary Examiner*—Erika A Gary
(74) *Attorney, Agent, or Firm*—Nathan O. Jensen; Kyle Eppele

(57) ABSTRACT

A method, a device, and a system for processing a request to establish a multicast session among a plurality of communication nodes are provided. The device includes a multicast management application. The multicast management application includes instructions to receive a criterion for joining a first multicast session. The instructions further include identifying a first multicast session address and a second multicast session address using the criterion for joining the first multicast session. The first multicast session is identified using a first multicast session address. A second multicast session is identified using the second multicast session address. A responder device that is a member of the second multicast session is identified using the second multicast session address. A multicast session announcement is sent to the identified responder device. The multicast session announcement includes the first multicast session address, the second multicast session address, and the criterion for joining the first multicast session.

20 Claims, 20 Drawing Sheets

OTHER PUBLICATIONS

G. Mulas, A. La Piana, F. Cau, P. Iodice, A. Tamoni, S. Antonini, "A Multi-Hop MANET Demonstrator Tested on Real-Time Applications" CEFRIEL—Politecnico di Milano, Milano, Italy, from http://www.ishilab.net/icmu2005/papers/117570-1-05030303031505.pdf, printed Aug. 1, 2005.

L. Zhu, B. Lee, B. Seet, K. Wong, G. Liu, S. Huang, and K. Lee, "Performance of New Broadcast Forwarding Criteria in MANET", Nanyang Technological University, Nanyang Avenue, Singapore, from http://www.cemnet.ntu.edu.sg/Permocom/papers/2004/forwarding-icoin.pdf, printed Aug. 1, 2005.

E. Royer and C.-K. Toh, "A Review of Current Routing Protocols for Ad Hoc Mobile Wireless Networks", IEEE Personal Communications, Apr. 1999.

C.W. Wu, Y.C. Tay, "AMRIS: A Multicast Protocol for Ad Hoc Wireless Networks", National University of Singapore, from http://www.cs.cornell.edu/courses/cs615/2001fa/615/amris.pdf, printed Aug. 1, 2005.

K. Paul, S. Bandyopadhyay, A. Mukherjee, D. Saha, "Evaluating the Performance of a Demand-Driven Multicast Routing Scheme in Ad-Hoc Wireless Networks", from http://www.iimcal.ac.in/research/adhocnet/Papers/36.pdf, printed Aug. 1, 2005.

S.-J. Lee, W. Su, J. Hsu, M. Gerla, and R. Bagrodia, "A Performance Comparison Study of Ad Hoc Wireless Multicast Protocols", In proceedings of the Fifth Annual ACM/IEEE International Conference on Mobile Computing and Networking, Mobicom '99, pp. 207-218, Aug. 1999.

P. Mohan, J. Johnson, K. Murugan, and V. Ramachandran, "A Comparative and Performance Study of On Demand Multicast Routing Protocols for Ad Hoc Networks", College of Engineering, Guindy(CEG), Anna University, from http://111.hipc.org/hipc2002/2002Posters/OnDemandMulticast.pdf, printed on Aug. 1, 2005.

* cited by examiner

DYNAMIC, MULTICAST ROUTING USING A QUALITY OF SERVICE MANAGER

FIELD OF THE INVENTION

The subject of the disclosure relates generally to routing within a network. More specifically, the disclosure relates to dynamic, multicast routing of packets between devices in an ad hoc network using a quality of service manager.

BACKGROUND

Layering is used to organize programming modules into separate functional components that interact in a sequential and hierarchical way so that each layer has an interface only to the layer above and below it, and thus, no need to understand the processing performed at any of the other layers. Communication programs may be structured in layers such that programming and hardware at both ends of the communication exchange use an identical set of layers. To process a message, data in a first device flows down through each layer and is transmitted through a physical media to a second device. Before reaching the second device, the message may "hop" multiple times before reaching the second device. The message is received at the second device, and the data flows up through the layers where it is ultimately presented to the user or used in an application at the second device.

A communication stack, for example, may include five layers: 1) a physical (PHY) layer, 2) a network interface layer, 3) an Internet Protocol (IP) layer, 4) a transport layer, and 5) an application layer. The PHY layer, also referred to as the hardware layer, provides the physical components that enable the transmission and reception of bits of information whether analog or digital. Access to the PHY layer is controlled by the network interface layer. The network interface layer provides transmission protocol knowledge and management, handles errors in the PHY layer, and provides flow control and frame synchronization. The network interface layer generally is divided into two sub-layers: the logical link control (LLC) sub-layer and the MAC sub-layer. The LLC sub-layer controls frame synchronization, flow control, and error checking. The MAC sub-layer provides transmission protocol knowledge and management thereby controlling how a device gains access to information, acquires the data path, and sends information over the data path. In general, the MAC sub-layer makes sure that devices sharing a common communications channel do not interfere with each other. Access control transmission technologies implemented at the MAC sub-layer include code division multiple access (CDMA), frequency division multiple access (FDMA), time division multiple access (TDMA), global system for mobile communications (GSM), general packet radio services (GPRS), carrier sense multiple access (CSMA), CSMA-collision detection (CSMA-CD), orthogonal frequency division multiplexing (OFDM), Aloha, slotted Aloha, spectrum portable management application (SPMA), Bluetooth, IEEE 802.11, etc.

IP is the method or protocol by which data is sent from one device to another through a network that may include both wired and wireless devices. Each device on the network has at least one IP address that uniquely identifies it from all of the other devices on the network. Originally, the devices were computers that connected to each other using IP through the Internet. Today, the devices that employ IP have expanded to include all types of communication devices including cellular phones, computers of any form factor including personal digital assistants, radios, etc. Using IP, a message is divided into small chunks called packets that each contain both the sender's IP address and the receiver's IP address. Each packet is treated as an independent unit of data without any relation to any other unit of data. The IP layer handles communication from one device to another device by providing, for example, the routing information that includes the IP addresses. Because a message is divided into a number of independent packets, each packet can, if necessary, be sent by a different route between the sending device and the receiving device. As a result, packets can arrive in a different order than the order in which they were sent.

The transport layer manages the end-to-end control of the data packets. The transport layer may use the user datagram protocol (UDP) or the transmission control protocol (TCP) to collect the packets and pass the packets on to the application layer. UDP passes the packets in the order in which they are received. TCP collects the packets and places the packets in the correct order before passing the packets to the application layer. The applications layer identifies other communication nodes, identifies quality of service, considers user authentication and privacy, identifies any constraints on data syntax, etc.

Quality of service (QoS) refers to the capability of a network to provide service to network traffic using various transmission technologies. The primary goal of QoS is to provide dedicated bandwidth, to control jitter and latency (required by some real-time and interactive traffic), and/or to improve loss characteristics based on a priority associated with specific network traffic while not allowing other network traffic flows to fail. As an example, different classes of traffic flow, such as voice, situational awareness, video, etc., can share the same network resources, yet be classified on an individual basis to assure high priority traffic receives sufficient bandwidth and speed of service during periods of network congestion.

The goal of ad-hoc networking technologies is to allow networks to automatically self-organize reducing the network planning burden and providing for task reorganization without operator intervention. Such self-organizing means that the protocol automatically identifies other communication devices as "neighbors" and links them together to create a wireless/wired network. In ad hoc networks including wireless communication devices, the wireless devices may move about arbitrarily. The mobility of the devices and the variability of other connection factors results in a network topology that may change rapidly and unpredictably. Ad hoc networks may or may not be connected with infrastructure such as the Internet. The basic assumption in an ad-hoc network is that two nodes willing to communicate may be outside the wireless transmission range of each other, but still be able to communicate in multiple hops, if other intermediate nodes in the network are willing to forward packets from them. Thus, routing in ad hoc networks requires the discovery of multi-hop paths between the wireless mobile nodes in the network that wish to communicate. Applications of ad hoc networks include military tactical communication, emergency relief operations, commercial and educational use in remote areas, etc.

Instead of sending data via multiple unicasts, multicasting reduces communication costs by minimizing bandwidth consumption and delivery delay. This is particularly important in a mobile, wireless environment where bandwidth is scarce and power availability limited. Multicast communication is an efficient means for supporting group-oriented applications, where the need for one-to-many or many-to-many data dissemination is frequent, for example, in situations involving disaster recovery or military battlefield scenarios. In multicast routing, packets from one sender must in general be delivered to multiple receivers all of which define a multicast group. Any node can send packets to the other devices in the multicast group at any time, and any node can join or leave the multicast group at any time.

Multicast routing, however, is a difficult problem in wired networks, and is even more challenging in ad hoc networks, due to the dynamic topology changes in the network due to node motion and wireless propagation variability, and due to the limited wireless network bandwidth and energy resources available at each communication node. Conventional routing protocols require knowledge of the topology of the entire network, and thus, are not suitable in a highly dynamic environment requiring topology update information to be propagated frequently throughout the network. What is needed is a multicast routing protocol that provides efficient and reliable routing of packets within an ad hoc network despite changing network topologies and radio channel characteristics. What is further needed is a multicast routing protocol that provides for the dynamic formation of multicast sessions.

SUMMARY

An exemplary embodiment of the present invention utilizes a multicast management application executing at communication nodes to provide dynamic multicast sessions across a plurality of multicast domains in an ad hoc network that may include both wired and/or wireless devices. The goal of routing protocols supporting multicast network traffic flow is to provide greater bandwidth efficiency across the network with a minimal increase in network overhead.

A device for processing a request to establish a multicast session among a plurality of communication nodes is provided. The device includes a multicast management application. The multicast management application includes instructions to receive a criterion for joining a first multicast session. The instructions further include identifying a first multicast session address and a second multicast session address using the criterion for joining the first multicast session. The first multicast session is identified using a first multicast session address. A second multicast session is identified using the second multicast session address. A responder device that is a member of the second multicast session is identified using the second multicast session address. A multicast session announcement is sent to the identified responder device. The multicast session announcement includes the first multicast session address, the second multicast session address, and the criterion for joining the first multicast session.

Another exemplary embodiment of the invention is a method of distributing data in a network, wherein the network includes a plurality of nodes and at least a portion of the plurality of nodes form a multicast group. The method includes receiving a communication signal from a first communication device. The communication signal includes the setup multicast session request. The method further includes identifying a responder device using the second multicast session address and sending a multicast session announcement to the identified responder device.

Still another exemplary embodiment of the invention includes a multicast session manager device that coordinates the transmission of multicast traffic across multicast domains and a communication device that requests formation of the multicast session.

Other principal features and advantages of the invention will become apparent to those skilled in the art upon review of the following drawings, the detailed description, and the appended claims.

BRIEF DESCRIPTION OF THE DRAWINGS

Exemplary embodiments of the invention will hereafter be described with reference to the accompanying drawings, wherein like numerals will denote like elements.

DETAILED DESCRIPTION

Figure 1:
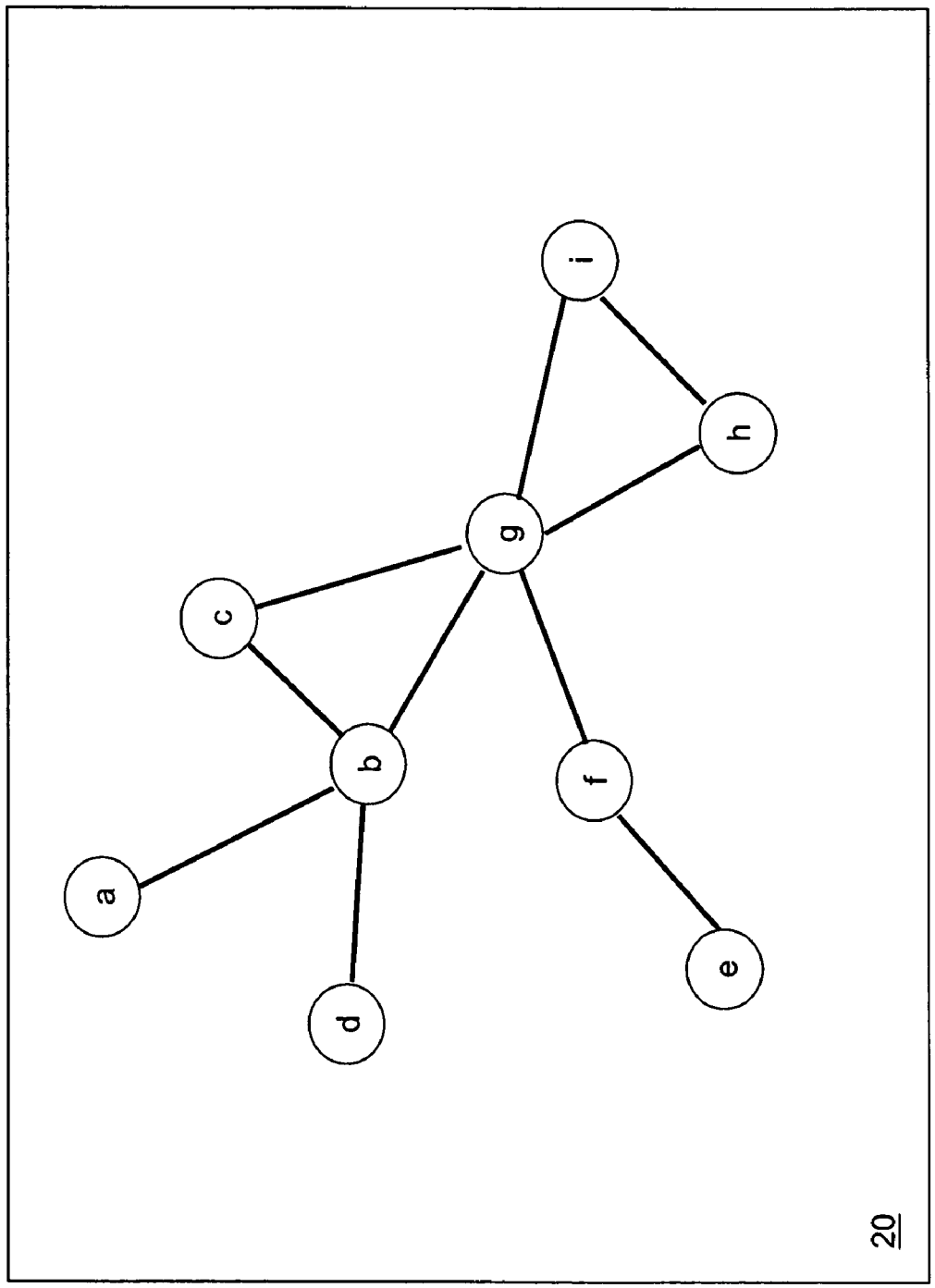
FIG. 1 is a node diagram of an exemplary domain including a plurality of nodes.
Figure 2:
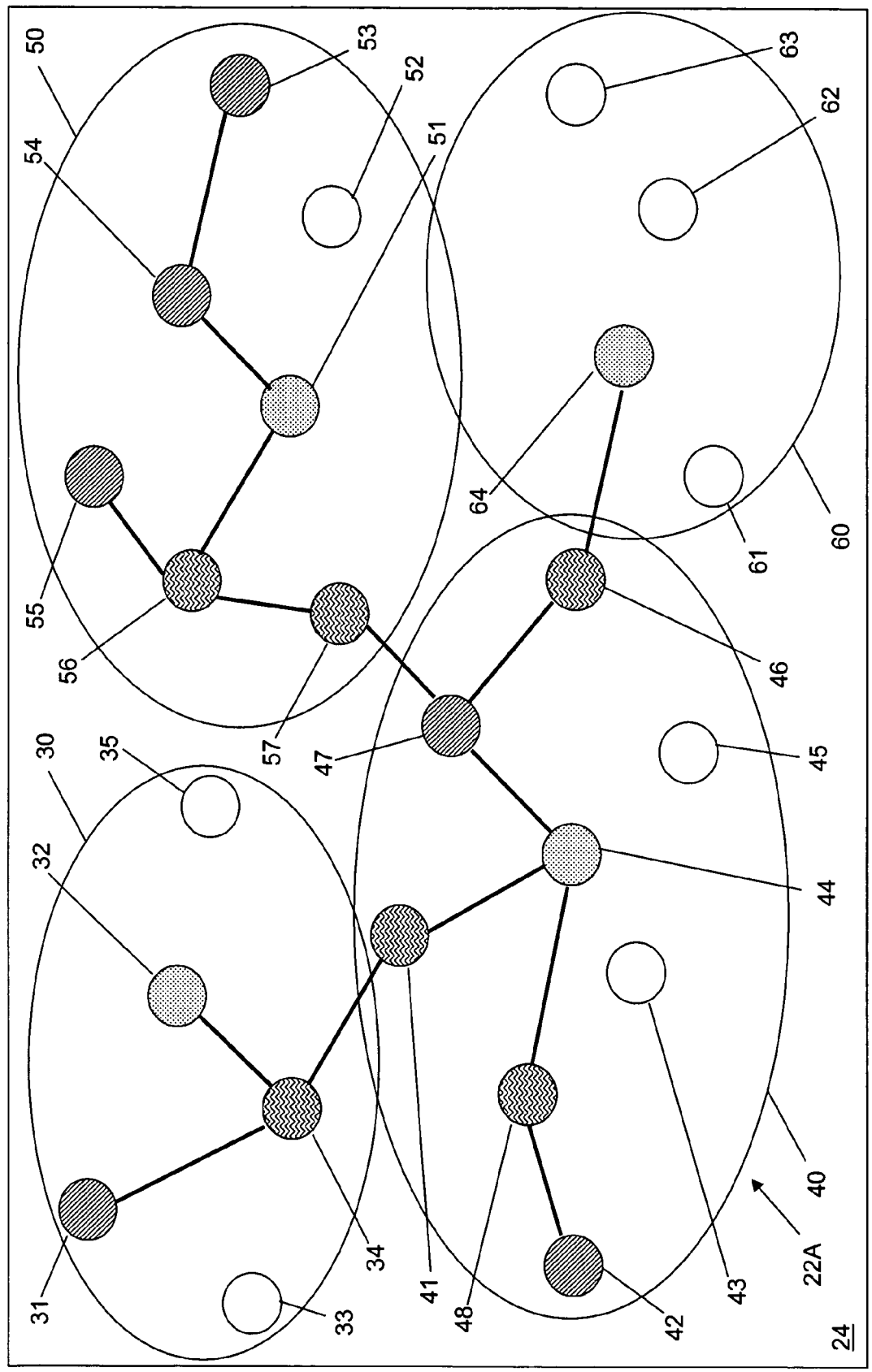
FIG. 2 is a node diagram of an exemplary network including a plurality of domains participating in a first multicast session.

With the growth in the number of communication nodes, the need to quickly and efficiently link communication devices has increased. Mobile, multi-hop, packet radio networks provide rapid and convenient deployment, self organization, mobility, and survivability. For illustration, FIG. 1 depicts a domain 20 that includes nodes a through i. Some of the nodes in domain 20 may not be in direct communication with the remaining nodes in the domain. Multiple hops may be required, for example, to provide communication between node d and node h. Example multi-hop paths supporting communication between nodes d-h include d-b-g-h, d-b-c-g-h, d-b-g-i-h, and d-b-c-g-i-h. Nodes organized into a plurality of domains also may be in communication. For example, FIG. 2 illustrates an ad hoc network 24 that includes a first domain 30, a second domain 40, a third domain 50, and a fourth domain 60 supporting a first multicast session 22A. Each domain 30, 40, 50, 60 includes a plurality of nodes. First domain 30, for example, includes a first node 31, a second node 32, a third node 33, a fourth node 34, and a fifth node 35. Second domain 40, for example, includes a first node 41, a second node 42, a third node 43, a fourth node 44, a fifth node 45, a sixth node 46, a seventh node 47, and a eighth node 48. Third domain 50, for example, includes a first node 51, a second node 52, a third node 53, a fourth node 54, a fifth node 55, a sixth node 56, and a seventh node 57. Fourth domain 60, for example, includes a first node 61, a second node 62, a third node 63, and a fourth node 64.

First multicast session 22A includes first node 31 of first domain 30, second node 42 and seventh node 47 of second domain 40, and third node 53, fourth node 54, and fifth node 55 of third domain 50. Forwarding nodes are utilized to support the multiple hops between nodes within the same domain (intra-domain) and between adjacent domains (inter-domain). Forwarding nodes for first multicast session 22A include fourth node 34 of first domain 30, first node 41, sixth node 46, and eighth node 48 of second domain 40, and seventh node 57 and sixth node 56 of third domain 50. The forwarding nodes send and receive packets to complete the communication paths between first multicast session 22A group members.

Each domain 30, 40, 50, 60 also includes a QoS manager (QM) selected dynamically from among the nodes in the domain to monitor network traffic and to provide network congestion management based on policies and goals defined to ensure that high priority network traffic is supported. A wide variety of tools can be used to provide the congestion management as known to those skilled in the art both now and in the future. Additionally, a number of different methods and algorithms can be used to select the QM from among the network nodes on a dynamic basis within a network including an ad hoc network. First domain 30 includes a first QM node 32, second domain 40 includes a second QM node 44, third domain 50 includes a third QM node 51, and fourth domain 60 includes a fourth QM node 64. In accordance with the invention, each QM node additionally supports multicast session management. Thus, each QM node is also a multicast session manager (MSM). As such, multicast messages are additionally routed to the MSM for each domain and then forwarded by the MSM to the destination node(s) within the domain and possibly to an MSM of an adjacent MSM domain.

Figure 3:
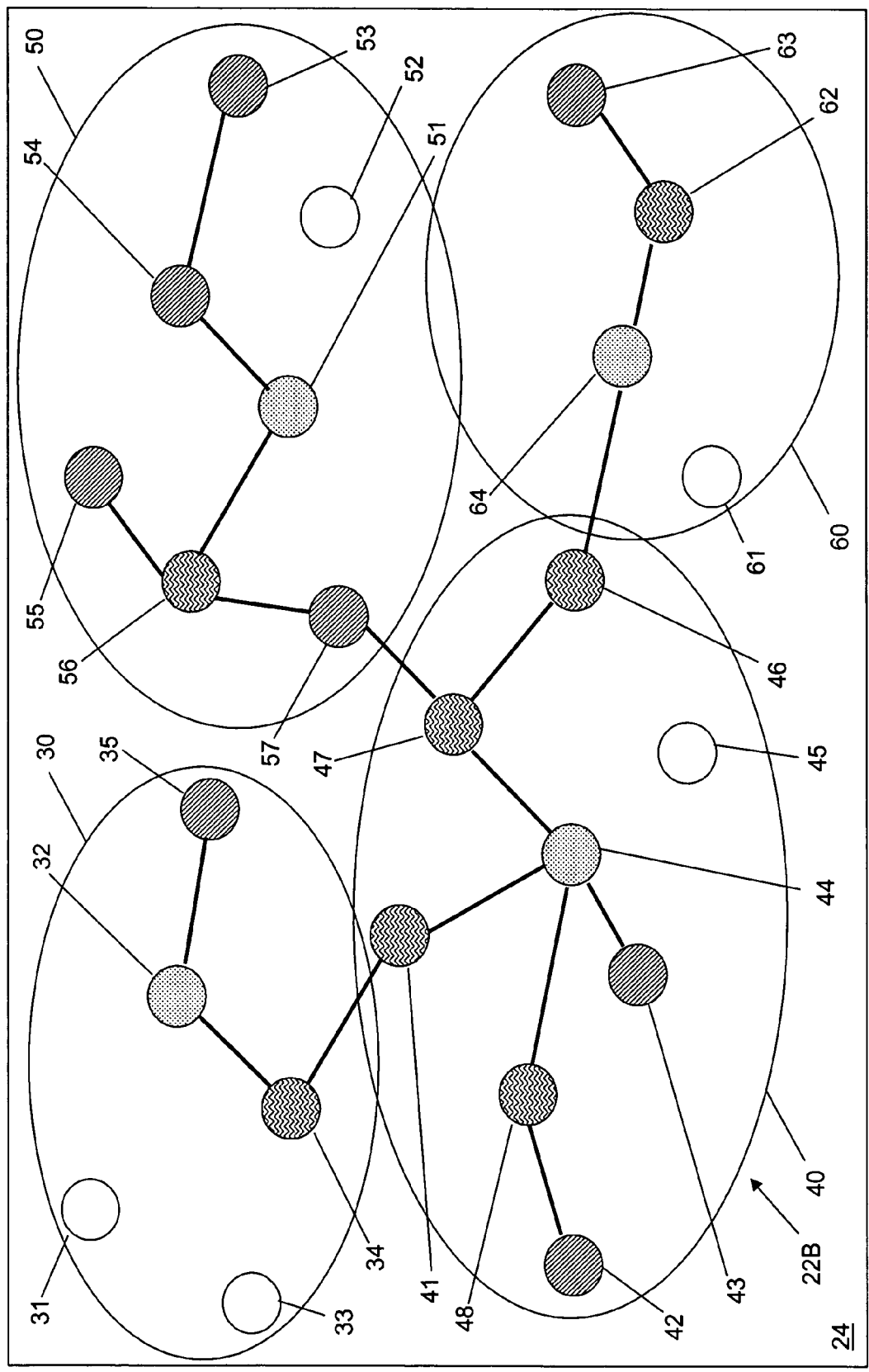
FIG. 3 is a node diagram of the exemplary network of FIG. 2 participating in a second multicast session.

As another example, FIG. 3 illustrates ad hoc network 24 that includes first domain 30, second domain 40, third domain 50, and fourth domain 60 supporting a second multicast session 22B. Second multicast session 22B includes fifth node 35 of first domain 30, second node 42 and third node 43 of second domain 40, third node 53, fourth node 54, fifth node 55, and seventh node 57 of third domain 50, and third node 63 of fourth domain 60. Forwarding nodes for second multicast session 22B include fourth node 34 of first domain 30, first node 41, sixth node 46, seventh node 47, and eighth node 48 of second domain 40, sixth node 56 of third domain 50, and second node 62 of fourth domain 60. The same QM nodes 32, 44, 51, 64 support second multicast session 22B.

Figure 4:
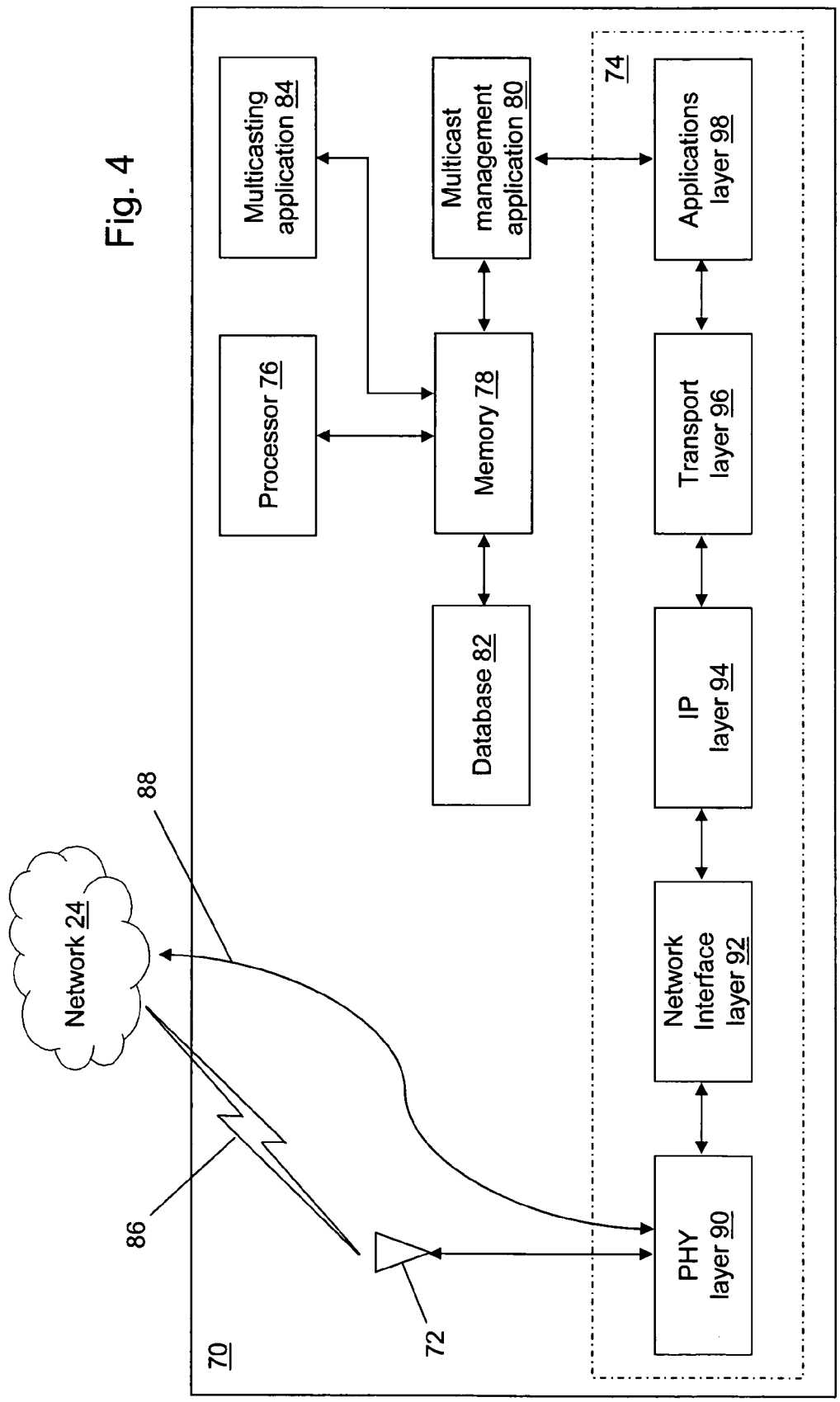
FIG. 4 is a block diagram of a communication device in accordance with an exemplary embodiment of the present invention.

With reference to FIG. 4, an exemplary communication device 70 is shown. Communication device 70 supports dynamic multicast routing of packets to/from nodes within network 24. Communication device 70 may include a transceiver antenna 72, a communication stack 74, a processor 76, a memory 78, a multicast management application 80, a multicasting application 84, and a database 82. Communication device 70 may provide communication capabilities across the entire communication spectrum or across only a portion of the spectrum utilizing a variety of access control transmission technologies including various modulation schemes.

In operation, a communication signal is received by transceiver antenna 72, sent up communication stack 74 to extract data/voice information from the communication signal, and the information is received at multicasting application 84. Similarly, communication stack 74 receives information from multicasting application 84, the information is sent down communication stack 74 forming the communication signal that is transmitted from transceiver antenna 72. In an alternative embodiment, communication device 70 may include separate transmit and receive antennas. Different and additional components may be utilized by communication device 70. For example, communication device 70 includes one or more power source that may be a battery, connectors, a chassis, and a display. In an additional embodiment, communication device 70 may include a remote connection to the transceiver antenna 72 and communication device 70 may exist as a line replaceable unit or slice in a communication suite.

Processor 76 executes instructions that may be written using one or more programming language, scripting language, assembly language, etc. The instructions may be carried out by a special purpose computer, logic circuits, or hardware circuits. Thus, processor 76 may be implemented in hardware, firmware, software, or any combination of these methods. The term "execution" is the process of running an application or the carrying out of the operation called for by an instruction. Processor 76 executes multicast management application 80 and/or other instructions. Device 70 may have one or more processor 76 that uses the same or a different processing technology. Additionally, processor 76 and memory 78 may be separate components of device 70 or may be embedded within another component of device 70.

Multicasting application 84 is an organized set of instructions that, when executed, cause device 70 to require a multicast session. Multicast management application 80 is an organized set of instructions that, when executed, cause device 70 to support dynamic multicast routing and processing of packets communicated within network 24. Multicast management application 80 may be written using one or more programming language, assembly language, scripting language, etc.

Memory 78 stores multicast management application 80 and database 82, in addition to other information so that the information can be reached by processor 76. Device 70 may have one or more memory 78 that uses the same or a different memory technology. Memory technologies include, but are not limited to, random access memory, read only memory, flash memory, etc.

Database 82 contains data for multicast management application 80 in an exemplary embodiment. The tables are stored in database 82 for access by memory 78. Database 82 may store the multicast management application data in groups organized into tables that may be linked. For example, device 70 maintains various tables to support processing of multicast messages. The data may be stored to a single database 82 or to multiple databases that are accessible by processor 76. Database 82 may utilize various database technologies and a variety of different formats as known to those skilled in the art both now and in the future including a simple file system, a relational database, and/or a system of tables.

Communication device 70 communicates with other devices using network 24. Devices in a network are connected by communication paths that may be wired or wireless. For example, device 70 may include a wireless interface to support a wireless connection 86 and/or a cable interface to support a wired connection 88. Device 70 may include a plurality of wireless and/or wired interfaces. Network 24 may include both wired and wireless devices, such as satellites, cellular antennas, radios, computers, etc. Network 24 additionally may interconnect with other networks and contain sub-networks. A network can be characterized by the type of access control transmission technology used. Access control transmission technologies include CDMA, FDMA, TDMA, GSM, GPRS, CSMA, CSMA-CD, OFDM, Aloha, slotted Aloha, SPMA, Bluetooth, IEEE 802.11, and others as known to those skilled in the art both now and in the future.

Conventional RF technology employs continuous sine waves that are transmitted with data embedded in the modulation of the sine waves' amplitude, phase, or frequency. In general, transceiver antenna 72 receives an analog signal. An analog RF/IF filter filters the received analog signal from a transmission RF to an intermediate frequency (IF). An analog-to-digital converter converts the IF signal from an analog signal to a digital signal. A modem demodulates and otherwise processes the digital signal to extract the information that is sent up through communication stack 74 to multicasting application 84 for use. Similarly, in a reverse procedure, digital data received from multicasting application 84 is sent down through communication stack 74, is modulated by the modem, converted from a digital signal to an analog signal, filtered from IF to RF, and transmitted by transceiver antenna 72. In an alternative embodiment, the signal transmitted/received is digital and no conversion is required. Communication device 20 transmits and receives data and/or voice information using communication stack 74 including multicast session information for use at device 70 or for forwarding by device 70.

Communication stack 74 may include a PHY layer 90, a network interface layer 92, an IP layer 94, a transport layer 96, and an applications layer 98. Various control messages are passed between the layers of communication stack 94 to transmit data from multicasting application 84 to a multicasting application at another communication device. The data from multicasting application 84 is "handed down" to the lower layers in communication stack 74 for actual transmission to a multicasting application at another communication device. Received data is "handed up" communication stack 74 to the appropriate multicasting application at the other communication device.

Multicasting application 84 resides within applications layer 98, which communicates data/voice information to transport layer 96. In general, transport layer 76 uses either TCP or UDP protocols in combination with IP to divide the data/voice information into one or more packet for efficient routing through network 24. On reception, the TCP protocol in transport layer 96 reassembles the packets into the original data/voice information sent to applications layer 98. Alternatively, if the UDP protocol is used, the packet data is sent to applications layer 98 to be reassembled by the receiving application.

Transport layer 96 prefixes a transport header onto each packet of the data/voice information received from applications layer 98. Transport header includes the source and destination ports, and, if TCP is the transport protocol, the sequence number of the packet. IP layer 94 includes the source and destination IP addresses for each packet in an IP header so that it is received at the correct communication device. IP output packets or "datagrams" are prefixed with the IP header. The IP protocol is used to route the packets from device to device. Each intervening device on network 24 checks the destination IP address to see where next to forward the packet. Thus, the packet may be transmitted through communication devices or using "multiple hops" before reaching the specified communication device. Device 70 includes routing tables that move the datagrams to the next "hop," which is either the destination device or another intermediate device. IP layer 94 hands over each datagram to network interface layer 92.

Network interface layer 92 generally is divided into two sub-layers: the LLC sub-layer and the MAC sub-layer. The LLC sub-layer controls frame synchronization, flow control, and error checking. The MAC sub-layer includes protocols that handle channel selection, channel access, and IP packet processing and controls how a device on network 24 gains access to the data/voice information, acquires the data path, and controls the movement of bits over the data path. Network interface layer 92 handles the routing and forwarding of the packet and encodes/decodes the datagram into bits forming a frame that includes a pre-fixed MAC header. The MAC header is composed of a MAC address, frame control, sequence control, duration information, and other fields. The MAC sub-layer protocols support methods of sharing the transmission medium among a number of devices and include CDMA, FDMA, TDMA, GSM, GPRS, CSMA, CSMA-CD, OFDM, Aloha, slotted Aloha, SPMA, Bluetooth, IEEE 802.11, etc. as known to those skilled in the art. The MAC sub-layer may be in the form of computer software, hardware, or both software and hardware. The MAC sub-layer interfaces directly with PHY layer 90.

PHY layer 90 conveys the bit stream through network 24 at the electrical and mechanical level. Thus, PHY layer 90 provides the hardware means of sending and receiving data on a carrier. PHY layer 90 may be in the form of computer software, hardware, or both software and hardware. PHY layer 90 sends information in the form of bits through transceiver antenna 72, after adding a PHY header to the network interface frame forming a physical packet. The modem modulates and demodulates the signal sent/received through the physical network media.

Multicast sessions are used to more efficiently send messages directed to multiple users. For example, multicast sessions are used for streaming audio and video over network 24 and for downloading a file to multiple users within network 24. IP multicast saves network bandwidth because the files are transmitted as one data stream through network 24 and only split apart to the session devices at the end of the path. A source transmits a multicast packet by using a multicast group address. Multiple receivers participating in the multicast session "listen" for network traffic from that group address. Multicast addresses are administered differently than unicast IP addresses. A block from 224.0.0.0 to 239.255.255.255 is set aside for multicast addresses. A small number of these addresses are registered and permanently assigned to a function, but not to a device. The remainder are in a pool and not permanently assigned. Each multicast session can encompass a unique subset of nodes (as shown with reference to FIGS. 2 and 3) including different source nodes or multiple source nodes. This results in a unique multicast routing structure for each multicast session. Some of the nodes are not participants in that particular multicast session but are included within the multicast session routing structure to forward the multicast message traffic. Therefore, each node within the multicast routing structure must be instructed to accept the multicast message traffic and to forward the traffic on to the next node in the multicast routing structure.

Figure 5:
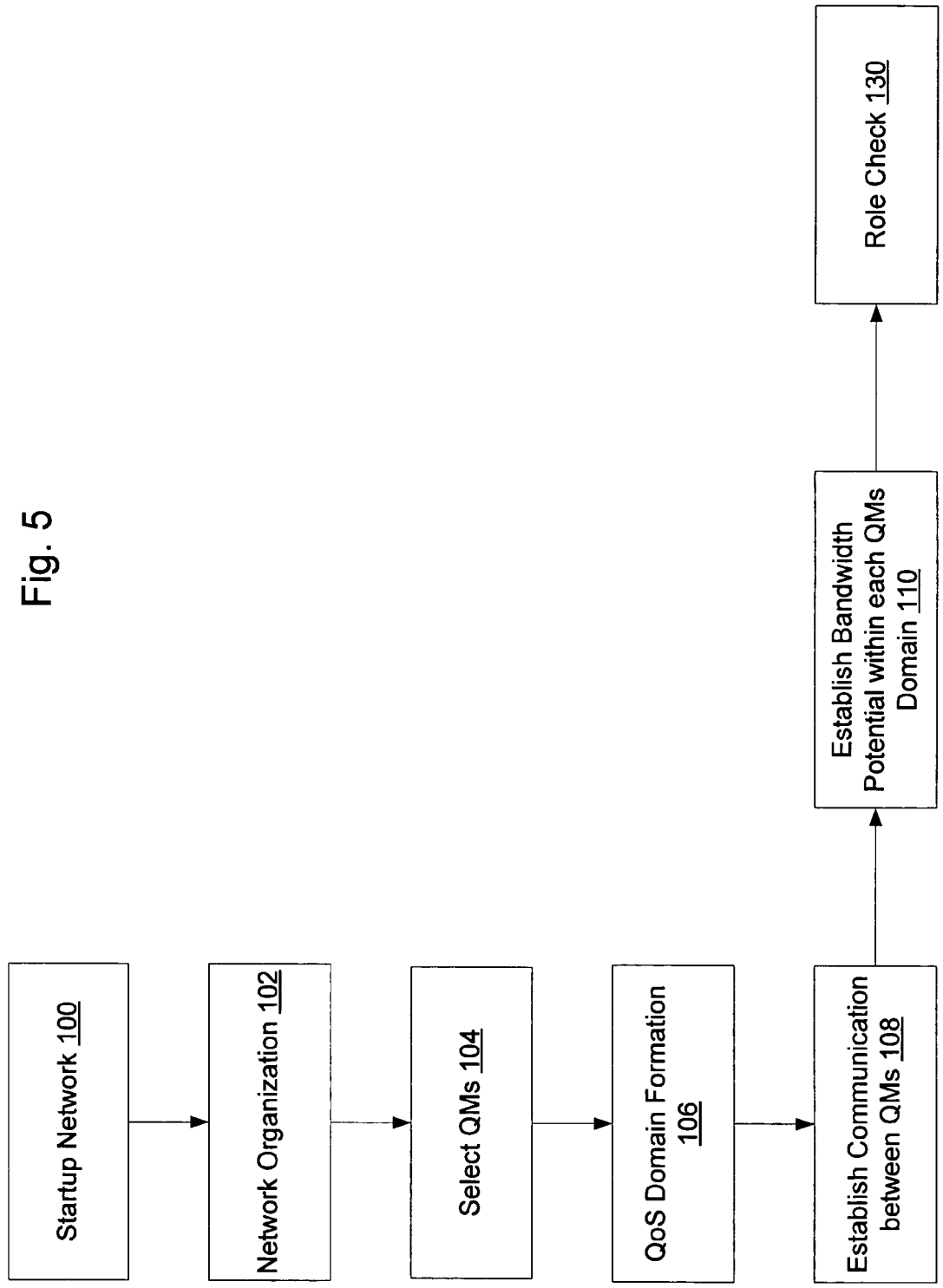
FIG. 5 is a flow diagram illustrating exemplary operations performed at nodes within the exemplary network of FIG. 2.

With reference to FIG. 5, functional blocks associated with network initialization are shown. Block 100 indicates network startup. Block 102 indicates network organization. At block 104, QMs are selected to provide QoS congestion management. At block 106, each QoS domain is formed. At block 108, communication is established between the selected QMs. At block 110, the bandwidth potential within each QoS domain is established. At block 130, each node identifies its role. Each QM also assumes the role of MSM. MSMs maintain awareness of multicast session membership across network 24. Thus, MSMs are the hub of each multicast domain. QMs/MSMs (the dual role of QM/MSM is henceforward denoted as MSM) are dynamically selected. A QoS domain and a multicast domain with the same QM/MSM may consist of the same nodes, but are not required to have all of the same nodes, since their domain formation algorithms are different. In general, overlap of the QoS domain and the multicast domain occurs, because the domains are composed of network nodes in the same area of network topology with the same hub node. Henceforward, unless stated otherwise, the term "domain" denotes a multicast domain. Domains and their corresponding MSM can be created or dissolved at any time and any node within the domain can assume the responsibility of performing the role of the MSM. For example, with reference to FIG. 2, fourth node 34 of first domain 30 may be selected as the MSM for domain 30 and second node 32 of first domain 30 may become a regular node within domain 30. Thus, the role check of block 130 is performed on a periodic basis as will be discussed in more detail with reference to FIG. 6.

Figure 6:
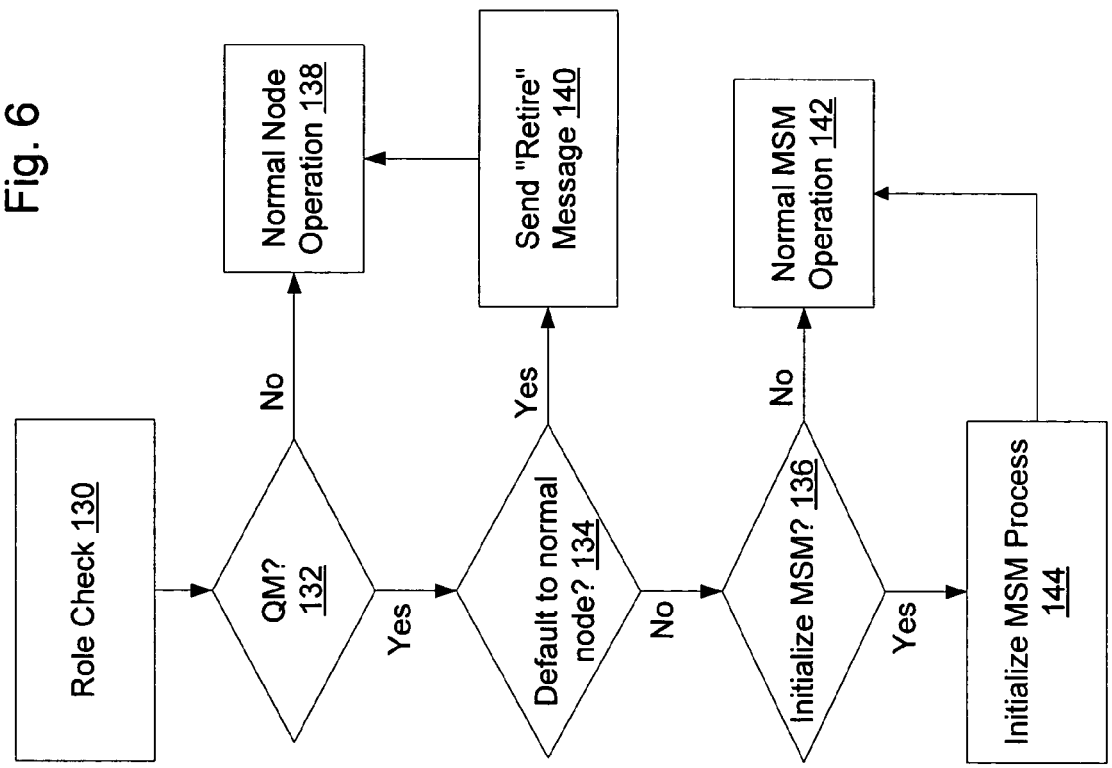
FIG. 6 is a flow diagram illustrating exemplary operations performed at each node within the exemplary network of FIG. 2 to identify the role of the node within its domain.

With reference to FIG. 6, exemplary operations of multicast management application 80 performed at communication device 70 are described. Multicast management application 80 of communication device 70 supports multicast message processing. In general, each node of network 24 executes an instance of multicast management application 80 because each node may assume the role of MSM, may act as a forwarding node, and/or may participate in one or more multicast session. Thus, communication device 70 is an exemplary node of network 24. A multicast path is established by sending a "Join" message to its MSM or between MSMs. A multicast path is created between MSMs to enable multicast message traffic from one domain to an adjacent domain. For example, second domain 40 and third domain 50 are adjacent domains of first domain 30. The cross domain multicast message traffic defines the routing structure across network 24. As part of role check processing, in an operation 132, device 70 determines if it is currently selected to perform the role of QM. If device 70 determines that it is not a QM, processing continues at operation 138. Operation 138 includes normal node processing as described in more detail with reference to FIG. 16. If device 70 determines that it is a QM, processing continues at operation 134. At operation 134, device 70 determines if it is defaulting back to normal node processing, and thus, relinquishing its role as MSM. If device 70 determines that it is defaulting back to normal node processing, in an operation 140, a "Retire" message is sent to each node in the domain and to each adjacent MSM on all multicast interfaces of device 70. After sending the "Retire" message, processing continues at operation 138. If device 70 determines that it is not defaulting back to normal node processing, in an operation 136, device 70 determines if initialization of its role as an MSM has been performed. If device 70 determines that initialization has been performed, normal MSM processing is performed in an operation 142 as described in more detail with reference to FIG. 8. If device 70 determines that initialization has not been performed, MSM initialization processing is performed in an operation 144 as described in more detail with reference to FIG. 7.

Figure 7:
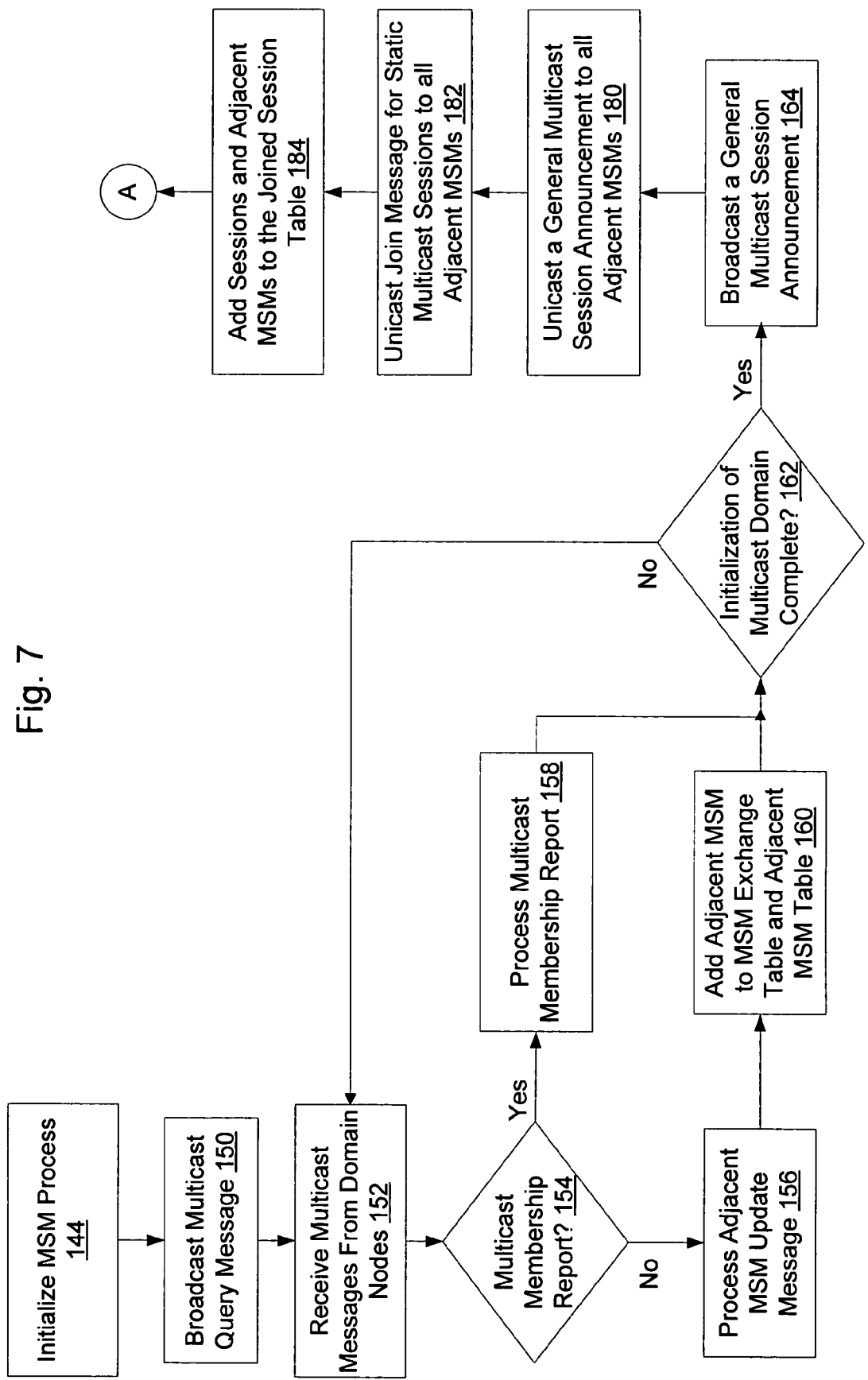
FIG. 7 is a flow diagram illustrating exemplary operations associated with initializing a node to perform the role of multicast session manager (MSM) within its domain.

With reference to FIG. 7, exemplary operations associated with MSM initialization processing at communication device 70 are described. In an operation 150, device 70 broadcasts a multicast query message on its interfaces to surrounding nodes to notify the nodes of its existence. In an operation 152, multicast messages are received from nodes that have selected device 70 to act as their MSM, and thus, to be included in the domain of device 70 in its role as MSM. In an operation 154, device 70 determines if the received multicast message includes a multicast membership report. If the received multicast message includes a multicast membership report, device 70 processes the multicast membership report in an operation 158. As part of multicast membership report processing, device 70 also may create/update a session membership table that includes a multicast address, one or more source node IP address, and a timestamp used to maintain the table. For example, an entry may be removed if the difference between the current time and the timestamp exceeds a defined period of time. The session membership table may be updated whenever device 70 receives a "Join" message from a node.

If the received multicast message does not include a multicast membership report, device 70 processes the received multicast message, which includes an adjacent MSM update message in an operation 156. The adjacent MSM update message is sent by a node whenever it receives a multicast query message from an MSM responsible for an adjacent domain. Thus, a node receives a query message from an adjacent MSM and forwards information relating to this query message to its MSM. In an operation 160, device 70 creates/updates an adjacent MSM table that includes, for example, an IP address for each adjacent MSM. Associated with each adjacent MSM is one or more reporting node IP address of nodes that received the query from the adjacent MSM. Associated with each reporting node IP address may be the number of hops between the reporting node and the adjacent MSM, the number of hops between the reporting node and its MSM, the sum of the hops which indicates the hops from the adjacent MSM to device 70, and a timestamp. The adjacent MSM table may be updated whenever device 70 receives an adjacent MSM update from a node in its domain.

Additionally, in operation 160, device 70 creates/updates an MSM exchange table that includes, for example, an address for each MSM of network 24, a timestamp associated with each MSM, and one or more multicast session address. The one or more multicast session address lists the multicast sessions in which a node of the MSM domain is participating. One or more adjacent MSM may be associated with each MSM of the MSM exchange table. Also, a number of hops between adjacent MSMs may be included in the MSM exchange table. The MSM exchange table may be updated whenever device 70 receives an adjacent MSM update from a node in its domain or from an adjacent MSM. In an operation 162, device 70 determines if initialization of its domain with respect to multicast processing is complete. For example, the determination may be based on a defined period of time. If initialization processing is not complete, processing continues at operation 152. If initialization processing is complete, processing continues at operation 164.

In operation 164, device 70 broadcasts a general multicast session announcement for all static multicast sessions. These static multicast sessions are pre-defined for network 24 to provide pre-defined multicast routing between nodes. For example, one static multicast session could include command vehicle nodes while another could include non-commissioned officer nodes, etc. Using a static multicast session limits the scope of a dynamic multicast session announcement, and thereby, limits the associated increase in network overhead. A possible alternative allows the entire set of nodes within network 24 to be included within a static multicast session; in essence performing broadcast as a multicast session. All MSMs are members of all of the static multicast sessions.

Inter-domain and intra-domain path creation is a means of setting up a multiple hop forwarding mechanism between nodes which are involved in forwarding a multicast message from the source to the destination nodes. The resulting forwarding structure is composed of paths between the source and the destination nodes. For example, a path exists between the source node and its MSM, between MSMs that forward the multicast message, and between the forwarding MSMs and any destination nodes within the forwarding MSMs domain.

In an operation 180, MSM to MSM (inter-domain) path cretion is started when device 70 unicasts a general multicast session announcement to all of its adjacent MSMs. A "Join" message is sent unicast by the receiving adjacent MSM and is returned as a unicast message to the MSM that sent the general multicast announcement. After receiving a response to the "Join" message from the adjacent MSM, the MSM that sent the general multicast announcement also returns a "Join" as a unicast message to the adjacent MSM for all static multicast sessions in an operation 182. Through this unicast routing mechanism, the path between MSMs is determined. Each node that receives the inter-domain "Join" adds the downstream node to its multicast forwarding table. Thus, a path is created in both directions from the MSM to the adjacent MSM. The multicast forwarding table includes, for example, a multicast session address for each multicast session. Associated with each multicast session address is one or more interface. Associated with each interface may be one or more downstream IP source address. A timestamp may be associated with each downstream IP source address. In an operation 184, the multicast session and corresponding adjacent MSMs are added to the joined session table. The joined session table includes, for example, a multicast session address for each multicast session. Associated with each multicast session address is one or more MSM IP address and a timestamp. The joined session table may be updated whenever device 70 receives an announcement message from another MSM. Processing continues at operation 142 as shown with reference to FIG. 8.

Figure 8:
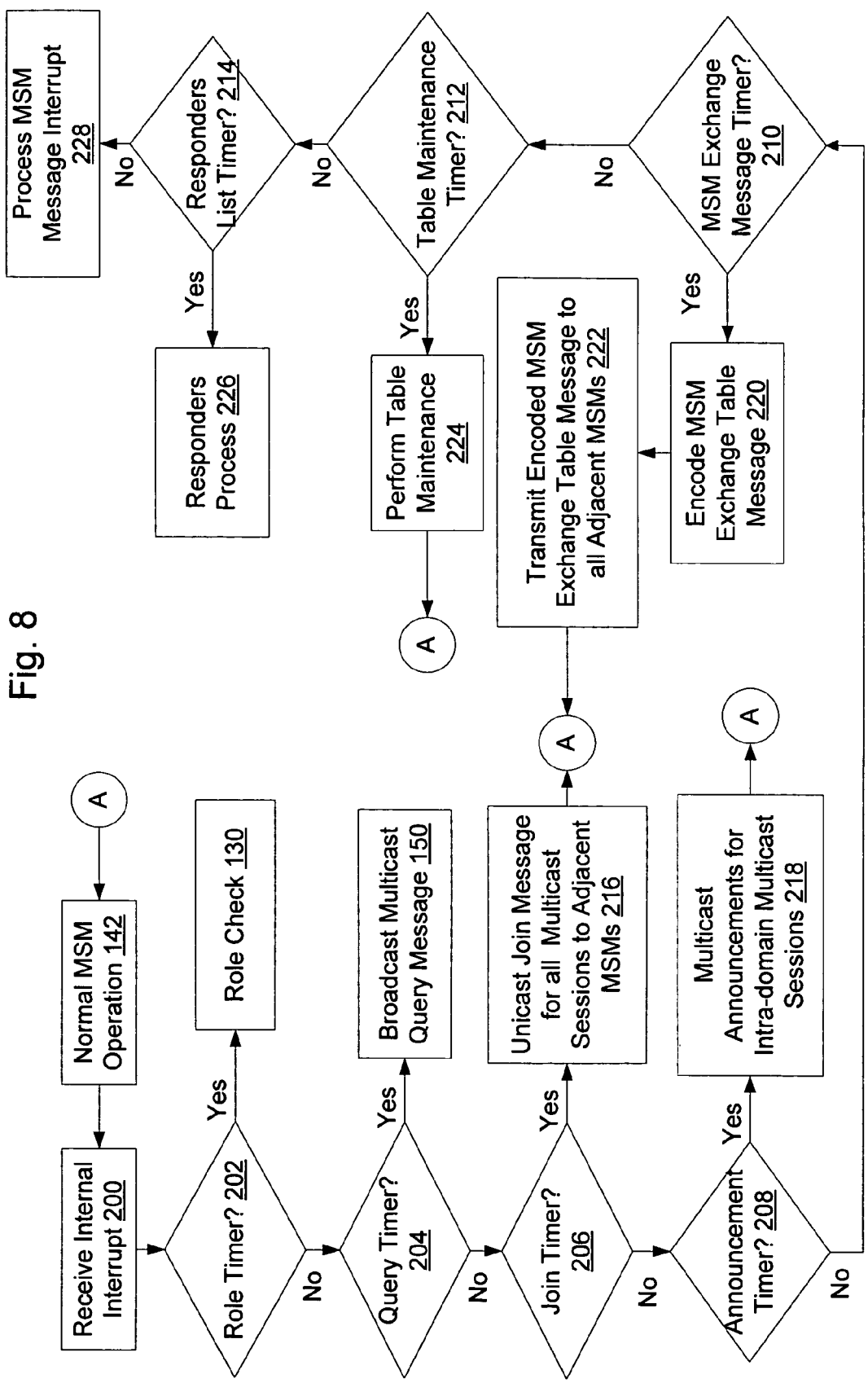
FIG. 8 is a flow diagram illustrating exemplary operations associated with normal operation of a node performing the role of MSM within its domain.

With reference to FIG. 8, exemplary operations associated with normal MSM processing at communication device 70 are described. In an operation 200, device 70 receives an internal interrupt. The interrupt may be associated with a number of different events. In an operation 202, device 70 determines if the interrupt results from a role timer periodically triggered to evaluate the role of the node. If the interrupt is triggered from the role timer, processing continues at operation 130 to evaluate the current role of the device 70. If the interrupt is not triggered from the role timer, in an operation 204, device 70 determines if the interrupt results from a query timer periodically triggered to send multicast query messages to the nodes within the domain of device 70. If the interrupt is triggered from the query timer, processing continues at operation 150 to send and to process multicast query messages.

If the interrupt is not triggered from the query timer, in an operation 206, device 70 determines if the interrupt results from a join timer periodically triggered to send join messages to adjacent MSM nodes. If the interrupt is triggered from the join timer, in an operation 216, a "Join" message is sent unicast to all adjacent MSMs associated with each multicast session, and processing continues at operation 142. If the interrupt is not triggered from the join timer, in an operation 208, device 70 determines if the interrupt results from an announcement timer periodically triggered to send multicast announcements to nodes within the domain of device 70. If the interrupt is triggered from the announcement timer, in an operation 218, an announcement is sent multicast to the nodes within the domain of device 70, and processing continues at operation 142.

If the interrupt is not triggered from the announcement timer, in an operation 210, device 70 determines if the interrupt results from an MSM exchange message timer periodically triggered to send an updated MSM exchange table between MSMs. If the interrupt is triggered from the MSM exchange message timer, in an operation 220, the MSM exchange table is encoded into a message, the message is transmitted to all adjacent MSMs in an operation 222, and processing continues at operation 142. If the interrupt is not triggered from the MSM exchange message timer, in an operation 212, device 70 determines if the interrupt results from a table maintenance timer periodically triggered to perform table maintenance. If the interrupt is triggered from the table maintenance timer, in an operation 224, table maintenance is performed, and processing continues at operation 142. Each time a periodic announcement or query message is sent by an MSM, the resulting response(s) are used to update the timestamp in the tables. Table maintenance includes removing data associated with time stamps that have "expired." For example, an "expired" timestamp may be identified based on the difference between the current time and the timestamp exceeding a defined time period. This time period may vary for each table. For example, in a highly dynamic network the time interval may be shortened. Thus, the amount of change within the network structure and the velocity of the nodes within network 24 may be used to determine the frequency of intra-domain announcements and queries, and thus, the frequency with which the tables are updated.

If the interrupt is not triggered from the table maintenance timer, in an operation 214, device 70 determines if the interrupt results from a responders list time out timer. The time out timer is set by a dynamic multicast session announcement. If the interrupt is triggered, 100 percent of the responses have not been received, and a responders process is performed, in an operation 226 as discussed in more detail with reference to FIG. 9. If the interrupt is not triggered from the time out timer, in an operation 228, an MSM message interrupt is processed as discussed in more detail with reference to FIG. 10.

Figure 9:
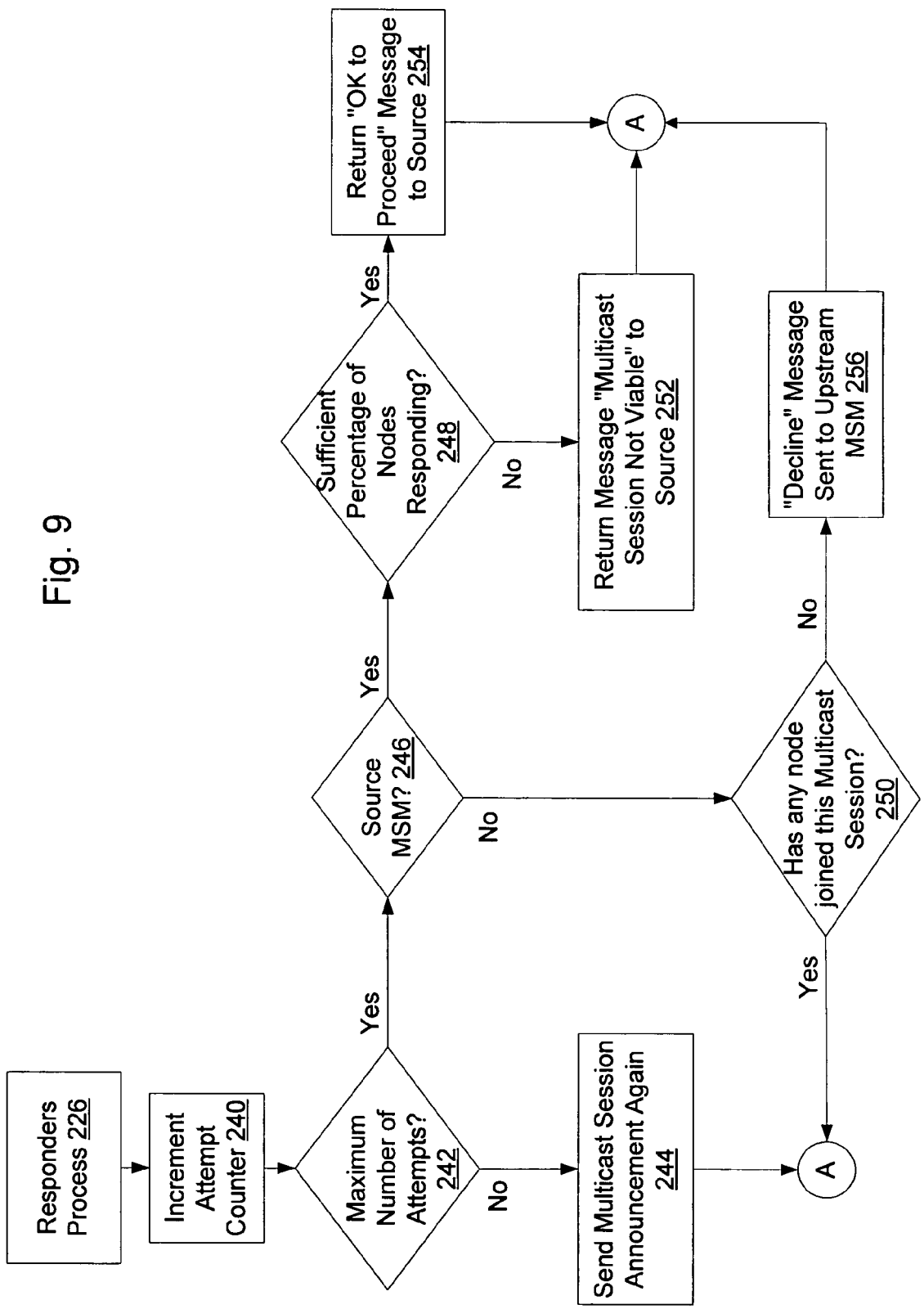
FIG. 9 is a flow diagram illustrating exemplary operations associated with processing of responders to a multicast session announcement message at an MSM.

With reference to FIG. 9, exemplary operations associated with processing of responders to a dynamic multicast session announcement message at communication device 70 are described. In an operation 240, an attempt counter is incremented. In an operation 242, the attempt counter is compared to a maximum attempt counter. If the maximum number of attempts has not been reached, device 70 sends another multicast session announcement, in an operation 244, and processing continues at operation 142. If the maximum number of attempts has been reached, device 70 determines, in an operation 246, if it is the source MSM for the multicast session to which the "Join-Decline" responses are directed. If device 70 is not the source MSM, device 70 determines if any node has joined the multicast session from its domain or if an adjacent MSM has joined the dynamic multicast session. If a node from the domain of device 70 or an adjacent MSM have joined the dynamic multicast session, device 70 processing continues at operation 142. If no node from the domain of device 70 or from an adjacent MSM have joined the multicast session, device 70 sends a "Decline" message to the upstream MSM, and processing continues at operation 142.

If device 70 is the source MSM, in an operation 248, device 70 determines if a sufficient percentage of nodes have responded to its dynamic multicast session announcement. The percentage is calculated based on the number of nodes and adjacent MSMs in the multicast session upon which the dynamic multicast session is formed. If a sufficient percentage of nodes and adjacent MSMs have responded, in an operation 254, device 70 sends an "OK to proceed" message to the node that is the source of the dynamic multicast session. If a sufficient percentage of nodes have not responded, in an operation 252, device 70 sends a "Multicast session not viable" message to the node that is the source of the dynamic multicast session. Processing continues at operation 142.

Figure 10:
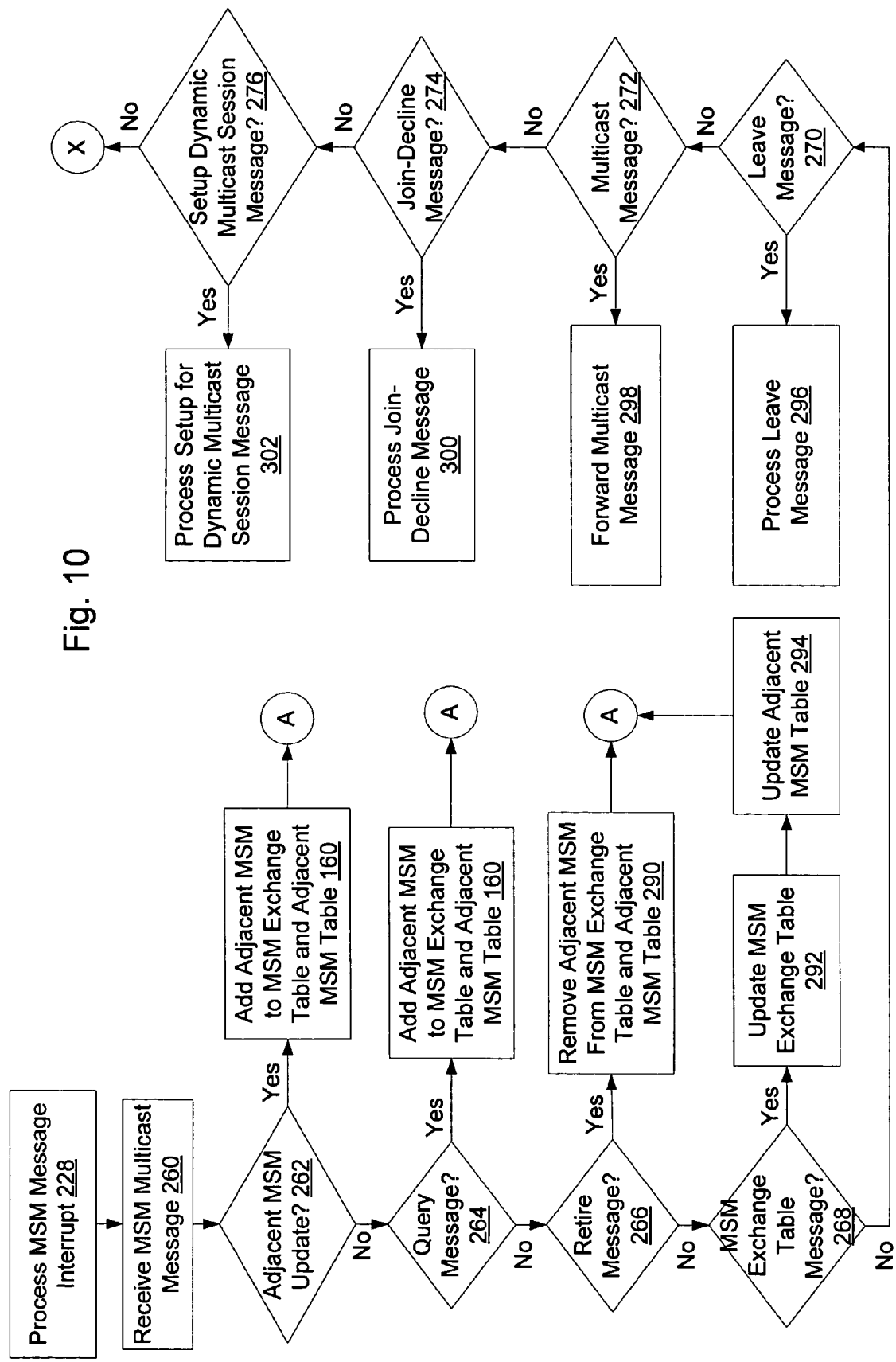
FIG. 10 is a flow diagram illustrating exemplary operations associated with processing of multicast messages at an MSM.

With reference to FIG. 10, exemplary operations associated with MSM message interrupt processing at communication device 70 are described. In an operation 260, an MSM multicast message is received. The message may be associated with a number of different events. In an operation 262, device 70 determines if the message is an adjacent MSM update message. If the message is an adjacent MSM update message, the adjacent MSM data is added to the MSM exchange table and the adjacent MSM table in operation 160, and processing continues at operation 142. If the message is not an adjacent MSM update message, device 70 determines if the message is a query message received from an adjacent MSM. If the message is a query message, the adjacent MSM data is added to the MSM exchange table and the adjacent MSM table in operation 160, and processing continues at operation 142.

If the message is not a query message, device 70 determines if the message is a "Retire" message. If the message is a "Retire" message, the MSM sending the "Retire" message is removed from the MSM exchange table and the adjacent MSM table in operation 290, and processing continues at operation 142. If the message is not a "Retire" message, device 70 determines if the message is an MSM exchange table message. If the message is an MSM exchange table message, the MSM exchange table is updated in an operation 292, the adjacent MSM table is updated in an operation 294, and processing continues at operation 142. If the message is not an MSM exchange table message, device 70 determines if the message is a "Leave" message in an operation 270. If the message is a "Leave" message, the "Leave" message is processed in an operation 296 described in more detail with reference to FIG. 12. If the message is not a "Leave" message, device 70 determines if the message is a multicast message in an operation 272. If the message is a multicast message, the multicast message is forwarded in an operation 298 described in more detail with reference to FIG. 14.

Figure 11:
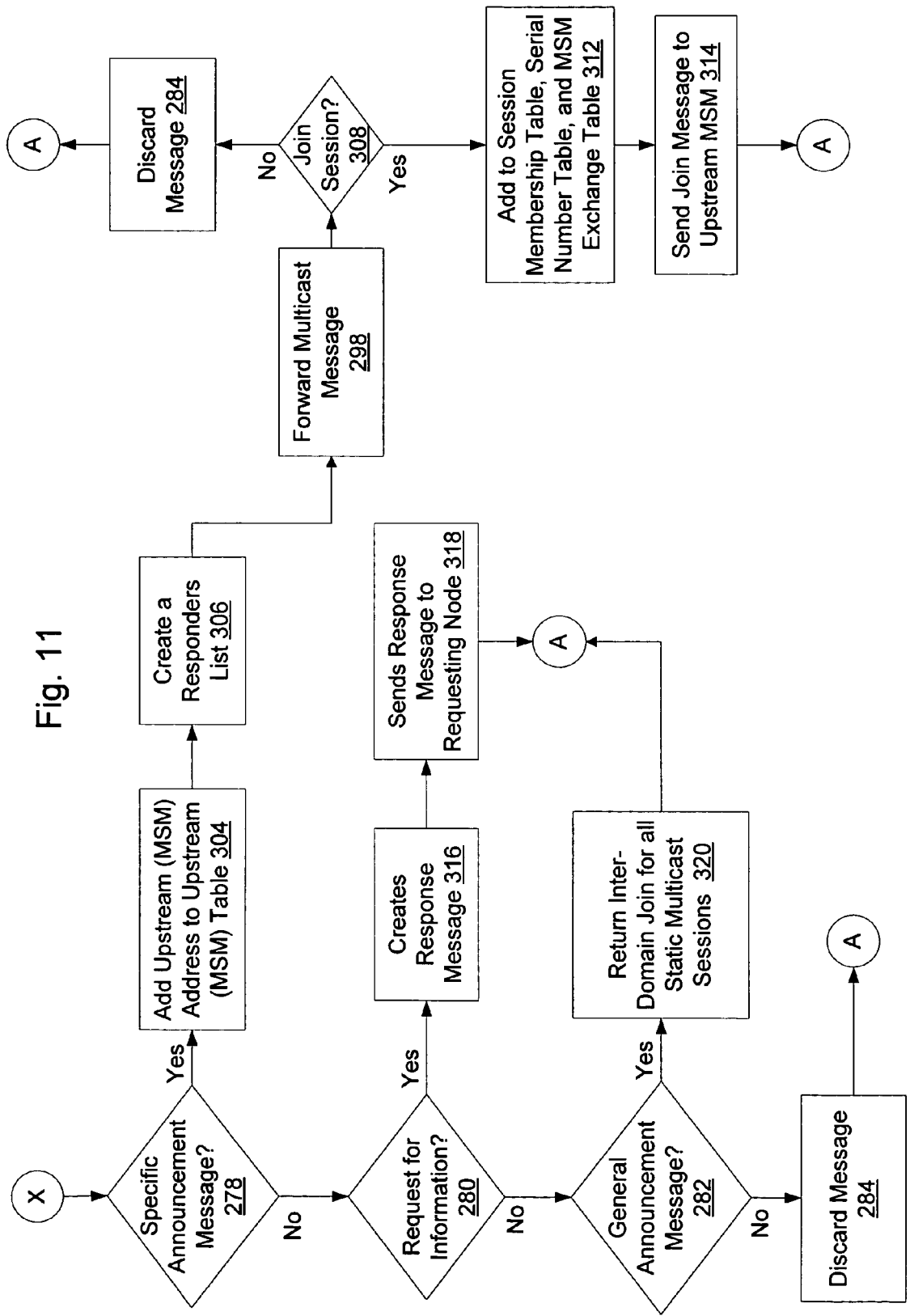
FIG. 11 is a flow diagram illustrating additional exemplary operations associated with processing of multicast messages at an MSM.

If the message is not a multicast message, device 70 determines if the message is a "Join-Decline" message received from a node in an operation 274. If the message is a "Join-Decline" message, the "Join-Decline" message is processed in an operation 300 described in more detail with reference to FIG. 15. If the message is not a "Join-Decline" message, device 70 determines if the message is a "setup dynamic multicast session" message in an operation 276. If the message is a "setup dynamic multicast session" message, the "setup dynamic multicast session" message is processed in an operation 302 described in more detail with reference to FIG. 13. If the message is not a "setup dynamic multicast session" message, device 70 determines if the message is a specific announcement message in an operation 278, as shown with reference to FIG. 11.

A specific announcement message is associated with a dynamic multicast session sent from the MSM of the source initiating the dynamic multicast session. If the message is a specific announcement message, an upstream MSM address included in the message is added to an upstream MSM table in an operation 304. The upstream MSM table, for example, includes a multicast session address and an associated upstream MSM address. The upstream MSM table may be updated when device 70 receives an announcement message from another MSM.

In an operation 306, a responders list is created. In operation 298, the multicast message including the specific announcement message is forwarded. In an operation 308, device 70 determines if the multicast session should be joined. If device 70 is not joining the multicast session, in an operation 284, the message is discarded and processing continues at operation 142. If device 70 is joining the multicast session, in an operation 312, the multicast session is added to the session membership table and the MSM exchange table. Additionally, the multicast session may be added to a serial number table that may include a flag and the multicast address of the multicast session. The flag indicates whether the device 70 has joined the multicast session or is a forwarding node for the multicast session. Associated with each multicast session is the IP address of the source of the multicast message packet received. The serial number table may be updated when a new multicast session is joined by device 70 or when a multicast packet is received at device 70. In an operation 314, a "Join" message is sent to the upstream MSM and processing continues at operation 142.

If the message is not a specific announcement message, device 70 determines if the message is a request for information in an operation 280. If the message is a request for information, a response message is created in an operation 316. In an operation 318, the response message is sent to the requesting node, and processing continues at operation 142. If the message is not a request for information, device 70 determines if the message is a general announcement message in an operation 282. A general announcement message is associated with all static multicast sessions. If the message is a general announcement message, in an operation 320, an inter-domain "Join" message is sent to the announcing MSM for all static multicast sessions, and processing continues at operation 142. If the message is not a general announcement message, in an operation 284, the message is discarded and processing continues at operation 142.

Figure 12:
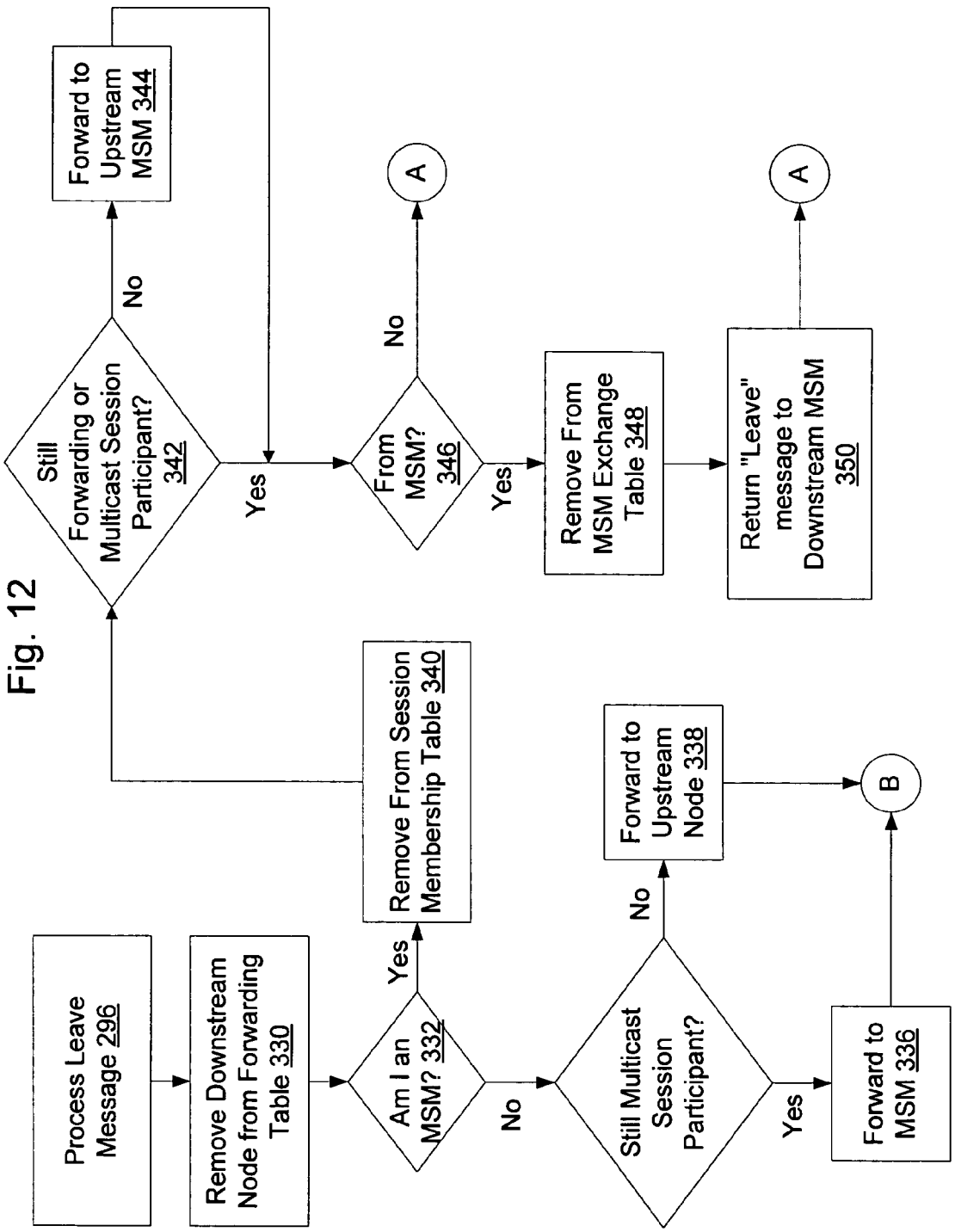
FIG. 12 is a flow diagram illustrating exemplary operations associated with processing of a "Leave" message at an MSM.

With reference to FIG. 12, exemplary operations associated with processing of a "Leave" message received at communication device 70 are described. In an operation 330, the downstream node is removed from the multicast forwarding table. In an operation 332, device 70 determines if it is an MSM. If device 70 is an MSM, the downstream node is removed from the session membership table in an operation 340. In an operation 342, device 70 determines if it is still a participant in the multicast session. Device 70 remains a participant if it is a member of the multicast session or if a node in its domain or a downstream MSM is still participating in the multicast session. If device 70 is no longer a participant, the "Leave" message is forwarded to the upstream MSM in an operation 344. If device 70 remains a participant, in an operation 346, device 70 determines if the "Leave" message is from an MSM. If the "Leave" message is not from an MSM, processing continues at operation 142. If the "Leave" message is from an MSM, in an operation 348, the MSM is removed from the MSM exchange table. In an operation 350, a return "Leave" message is sent to the downstream MSM, and processing continues at operation 142. If device 70 is not an MSM, in an operation 334, device 70 determines if it is still a participant in the multicast session. If device 70 is no longer a participant, the "Leave" message is forwarded to the upstream node in an operation 338. If device 70 remains a participant, in an operation 336, device 70 forwards the "Leave" message to its MSM.

Figure 13:
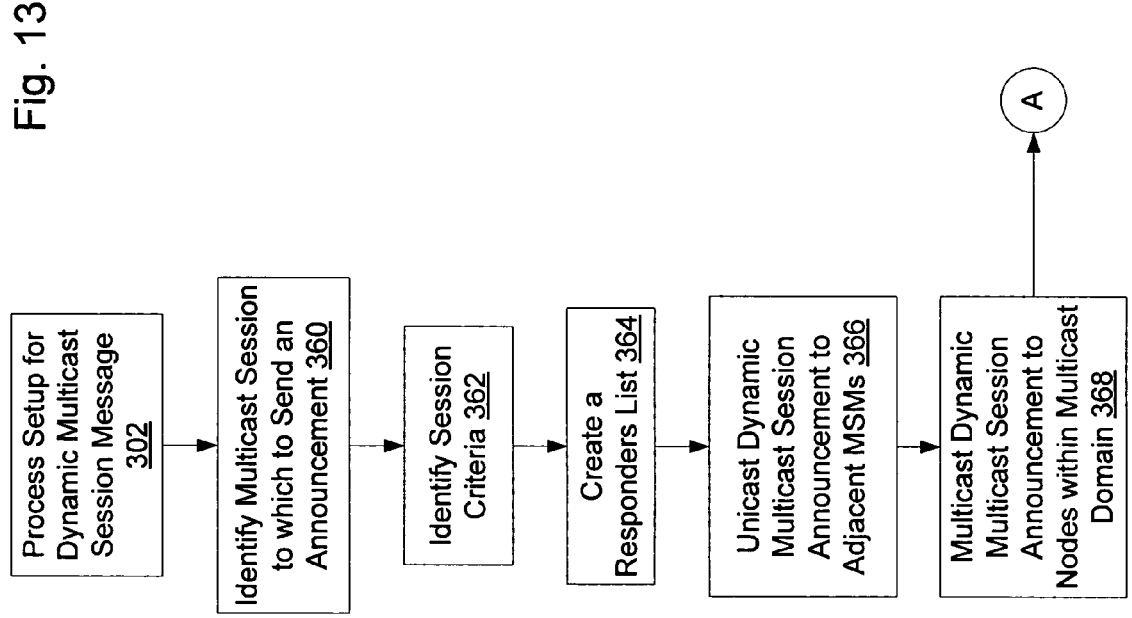
FIG. 13 is a flow diagram illustrating exemplary operations associated with processing of a setup multicast session message at an MSM.

With reference to FIG. 13, exemplary operations associated with setup for a dynamic multicast session are described. In an operation 360, a multicast session is identified for which to send an announcement. For example, a node within the domain of device 70 initiates the dynamic multicast sessions after executing an application which uses a multicast session. The source node initiating the dynamic multicast session sends a request to its MSM for a multicast session. Within the request are the "Join" criteria for each node to evaluate in determining whether or not to join the dynamic multicast session. In an operation 362, "Join" criteria for the multicast session are identified. The "Join" criteria may be saved in a session criteria table that includes, for example, a static multicast session address. Associated with each static multicast session address is one or more dynamic multicast session address created based on the static multicast session, the "Join" criteria for that dynamic multicast session, and an upstream MSM address. The session criteria table may be updated when device 70 receives an announcement message from another MSM. Each node receiving the announcement joins or declines the dynamic multicast session based on the "Join" criteria. The user at the source node selects the desired type of receiving nodes, and the receiving node users may specify in a profile their reply: join or decline. In an operation 364, a responders list is created by the MSM based on the members of the static multicast session upon which the dynamic multicast session is based. In an operation 366, a dynamic multicast session announcement is sent to adjacent MSMs using a unicast transmission. In an operation 368, a specific announcement of the dynamic multicast session is sent to nodes within the domain of device 70 using a multicast transmission. Processing continues at operation 142.

Figure 14:
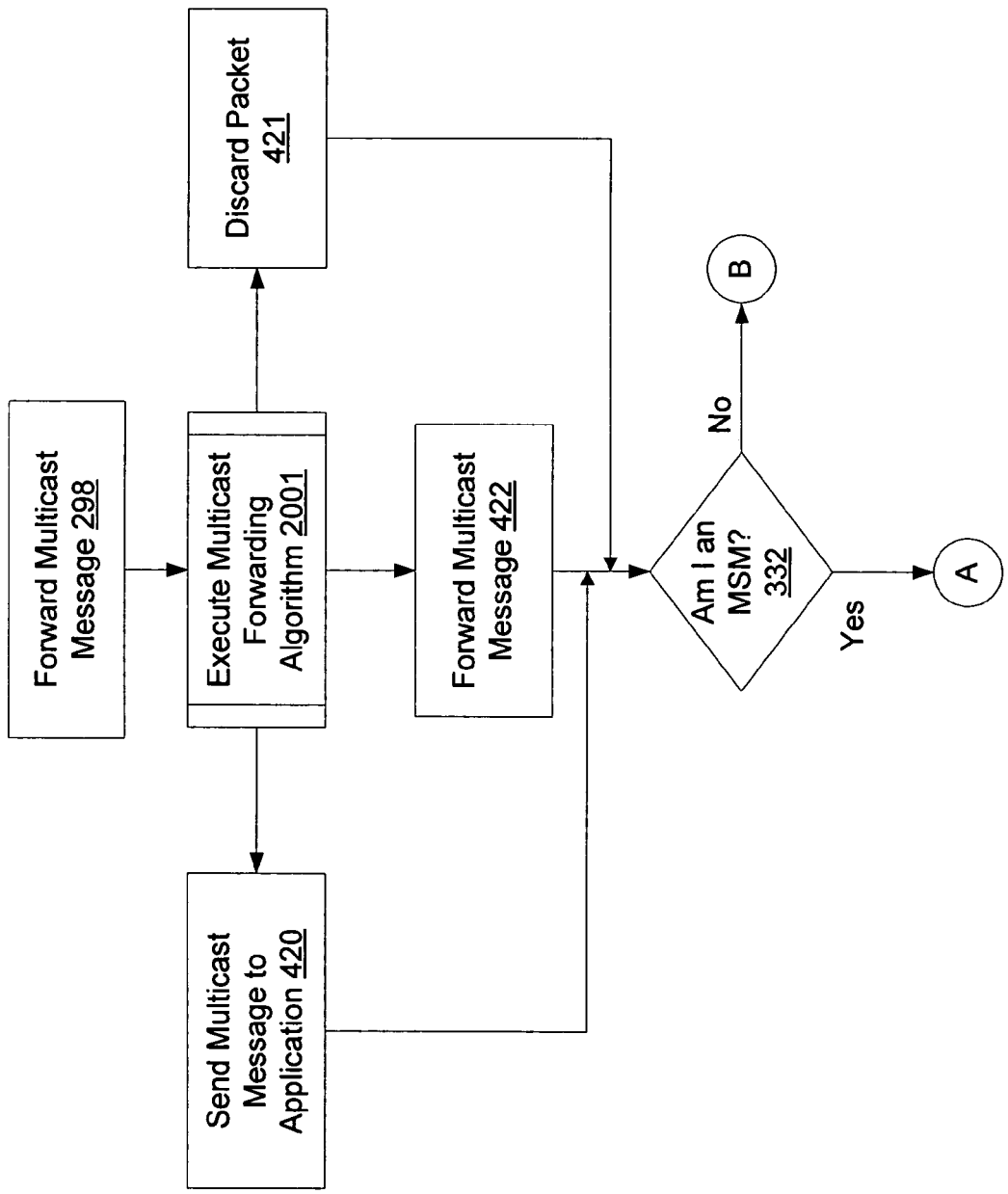
FIG. 14 is a flow diagram illustrating exemplary operations associated with forwarding of a multicast message at an MSM.

With reference to FIG. 14, exemplary operations associated with multicast message forwarding at communication device 70 are described. In an operation 2001, a multicast forwarding algorithm is executed. The multicast message traffic flow within a multicast domain is bidirectional. "Downstream" multicast message traffic flows away from the MSM to the nodes and "Upstream" traffic flows toward the MSM from the nodes. The multicast message forwarding algorithm handles both downstream and upstream multicast traffic. Within a multicast domain, multicast traffic flows to an from the hub, with the MSM serving as the hub. In addition, multicast message traffic between MSMs uses the same forwarding algorithm. The flow between MSMs is enabled by having an adjacent MSM appended as a downstream node to the list of nodes for an MSM. By appending all of the MSMs to each other, cross multicast domain multicast message traffic is enabled. A result of the multicast forwarding algorithm identifies the continued processing of the multicast message packet received at device 70. For example, the packet may be discarded in an operation 421, and/or may be sent to an application for processing in an operation 420, and/or may be forwarded to another node in an operation 422. In an operation 332, device 70 determines if it is an MSM. If device 70 is an MSM, processing continues at operation 142. If device 70 is not an MSM, processing continues at an operation 138 described with reference to FIG. 16.

Figure 15:
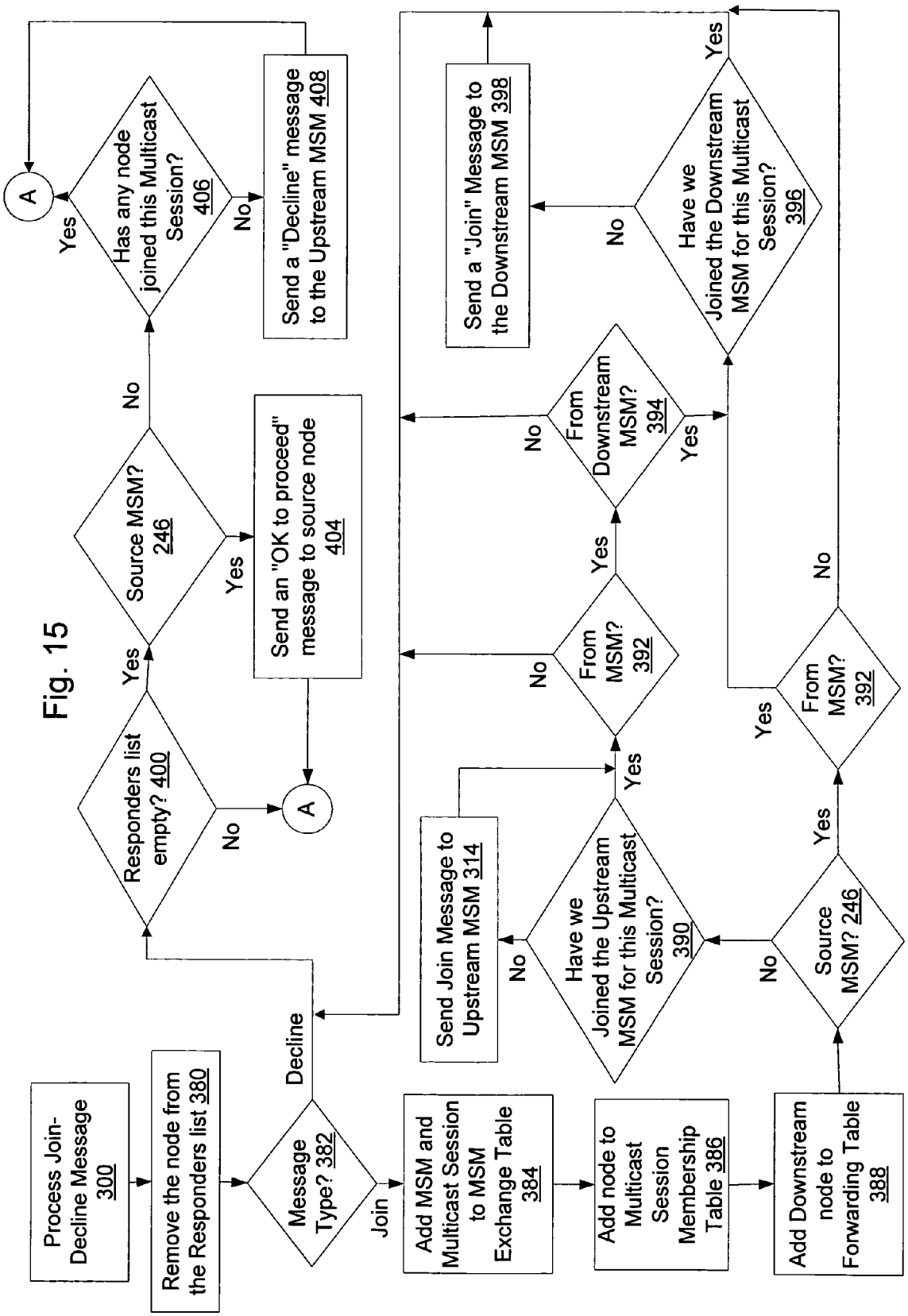
FIG. 15 is a flow diagram illustrating exemplary operations associated with processing of a "Join-Decline" message at an MSM.

With reference to FIG. 15, exemplary operations associated with processing of a "Join-Decline" message at communication device 70 are described. In an operation 380, the responding node is removed from the responders list. In an operation 382, device 70 determines the message type. If the message type is a "Decline" message, device 70 determines if the responders list is empty in an operation 400. If the responder list is not empty, processing continues at operation 142. If the responders list is empty, device 70 determines if it is the MSM of the source node initiating the dynamic multicast message in an operation 246. If device 70 is the source MSM, in an operation 404, an "OK to proceed" message is sent to the source node and processing continues at operation 142. If device 70 is not the source MSM, in an operation 406, device 70 determines if any nodes have joined the dynamic multicast session. If a node has joined the multicast session, processing continues at operation 142. If a node or a downstream MSM have not joined the multicast session, a "Decline" message is sent to the upstream MSM, in an operation 408, and processing continues at operation 142.

If the message type is a "Join" message, the MSM and the multicast session address are added to the MSM exchange table in an operation 384. The IP address of the joining node is added to the multicast session membership table in an operation 386. The downstream node is added to the multicast forwarding table in an operation 388. In operation 246, device 70 determines if it is the source MSM for the multicast session to which the "Join" message is directed. If device 70 is the source MSM, in an operation 392, device 70 determines if the "Join" message was sent from an MSM. If the "Join" message was not sent from an MSM, processing continues at operation 400. If the "Join" message was sent from an MSM, in an operation 396, device 70 determines if a "Join" message was sent to the downstream MSM. If the "Join" message was not sent to the downstream MSM, a "Join" message is sent to the downstream MSM in an operation 398, device 70 sends a "Join" message to the downstream MSM, and processing continues at operation 400. If the "Join" message was sent to the downstream MSM, processing continues at operation 400.

If device 70 is not the source MSM, in an operation 390, device 70 determines if a "Join" message has been sent to the upstream MSM for the multicast session. If the "Join" message has not been sent to the upstream MSM, a "Join" message is sent to the upstream MSM in an operation 314, and processing continues at operation 392. If the "Join" message has been sent to the upstream MSM, processing continues at operation 392. If the "Join" message was not sent from an MSM, processing continues at operation 400. If the "Join" message was sent from an MSM, in an operation 394, device 70 determines if the "Join" message has been sent from a downstream MSM. If the "Join" message was not sent from a downstream MSM, processing continues at operation 400. If the "Join" message was sent from a downstream MSM, processing continues at operation 396.

Figure 16:
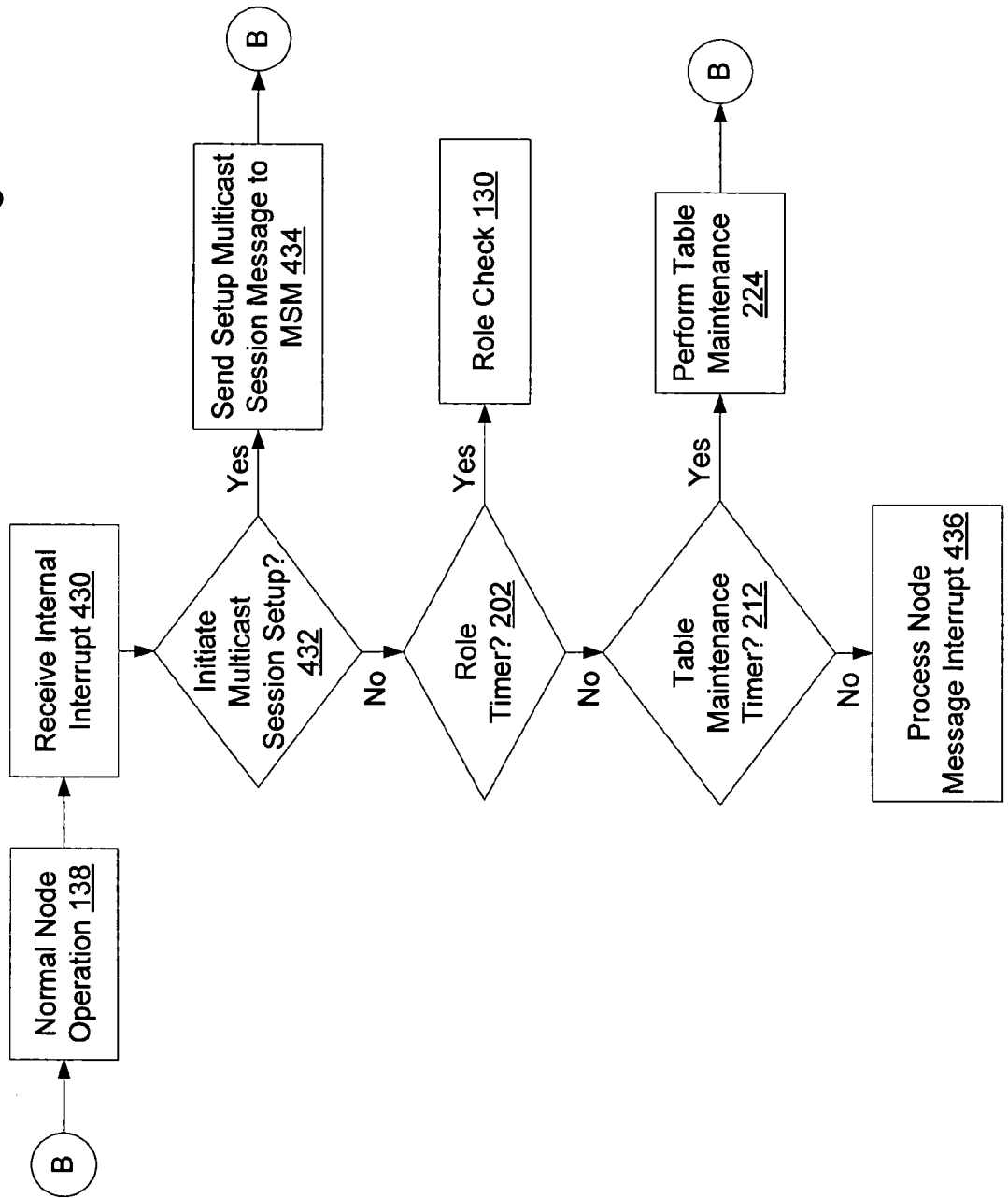
FIG. 16 is a flow diagram illustrating exemplary operations associated with normal operation of a node that is not performing the role of MSM within its domain.

With reference to FIG. 16, exemplary operations associated with normal node processing at communication device 70 are described. In an operation 430, device 70 receives an internal interrupt. The interrupt may be associated with a number of different events. In an operation 432, device 70 determines if the interrupt indicates initiation of a multicast session setup. For example, an application that utilizes a multicast session is executed at device 70. If the interrupt indicates initiation of a multicast session setup, a setup multicast session message is sent to the MSM of device 70 in an operation 434, and processing continues at operation 138. If the interrupt does not indicate initiation of a multicast session setup, in an operation 202, device 70 determines if the interrupt results from a role timer periodically triggered to evaluate the role of the node. If the interrupt is triggered from the role timer, processing continues at operation 130 to evaluate the current role of the device 70. If the interrupt is not triggered from the role timer, in an operation 212, device 70 determines if the interrupt results from a table maintenance timer periodically triggered to perform table maintenance. If the interrupt is triggered from the table maintenance timer, in an operation 224, table maintenance is performed and processing continues at operation 138. Table maintenance includes removing data associated with time stamps that have "expired." For example, an "expired" timestamp may be identified based on the difference between the current time and the timestamp exceeding a defined time period. This time period may vary for each table. If the interrupt is not triggered from the table maintenance timer, in an operation 436, the node message interrupt is processed as discussed in more detail with reference to FIG. 17.

Figure 17:
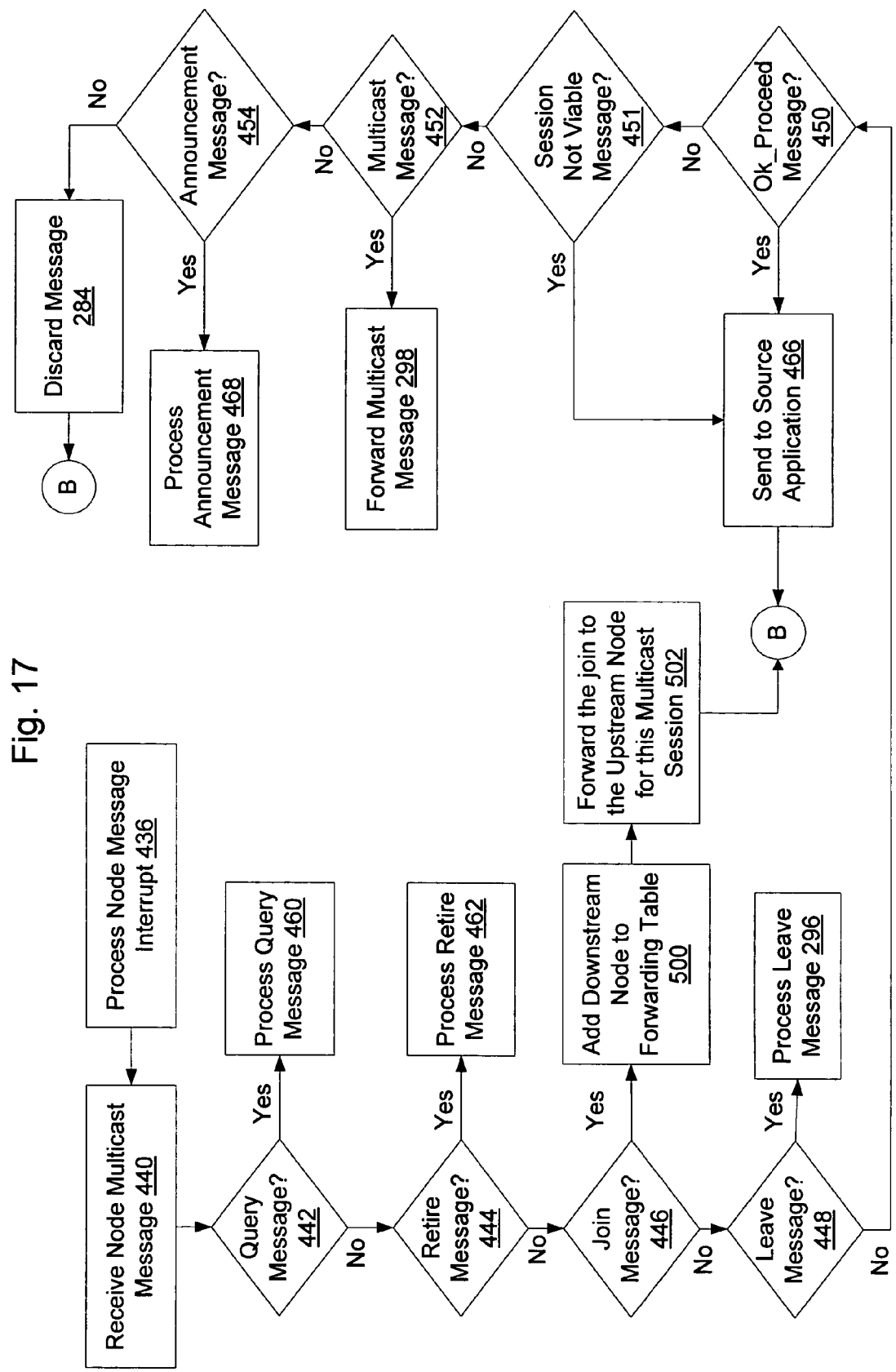
FIG. 17 is a flow diagram illustrating exemplary operations associated with processing of multicast messages at a regular node.

With reference to FIG. 17, exemplary operations associated with processing of a normal node message interrupt at communication device 70 are described. In an operation 440, a node multicast message is received. The message may be associated with a number of different events. In an operation 442, device 70 determines if the message is a query message received from an MSM. If the message is a query message, the query message is processed, in an operation 460, as discussed in more detail with reference to FIG. 18. If the message is not a query message, device 70 determines if the message is a "Retire" message in an operation 444. If the message is a "Retire" message, the "Retire" message is processed, in an operation 462, as discussed in more detail with reference to FIG. 19. If the message is not a "Retire" message, device 70 determines if the message is a "Join" message in an operation 446. If the message is a "Join" message, the downstream node is added to the multicast forwarding table in an operation 500, the "Join" message is forwarded to the upstream node for this multicast session in an operation 502, and processing continues at operation 138.

If the message is not a "Join" message, device 70 determines if the message is a "Leave" message received from a downstream node in an operation 448. If the message is a "Leave" message, the "Leave" message is processed, in an operation 296, described in more detail with reference to FIG. 12. If the message is not a "Leave" message, device 70 determines if the message is an "OK to proceed" message received from the MSM in an operation 450. If the message is an "OK to proceed" message, device 70 send the message to the source application, in an operation 466, and processing continues at operation 138. If the message is not an "OK to proceed" message, device 70 determines if the message is a "Multicast Session not Viable" message in an operation 451. If the message is a "Multicast Session not Viable" message, device 70 sends the message to the source application, in an operation 466, and processing continues at operation 138. If the message is not a "Multicast Session not Viable" message, device 70 determines if the message is a multicast message in an operation 452. If the message is a multicast message, the multicast message is forwarded in an operation 298 described in more detail with reference to FIG. 14.

If the message is not a multicast message, device 70 determines if the message is an announcement message received from an MSM in an operation 454. An announcement message is sent from an MSM and is associated with a multicast session that may be static or dynamic. If the message is an announcement message, the announcement message is processed in an operation 468 described in more detail with reference to FIG. 20. If the message is not an announcement message, in an operation 284, the message is discarded, and processing continues at operation 138.

Figure 18:
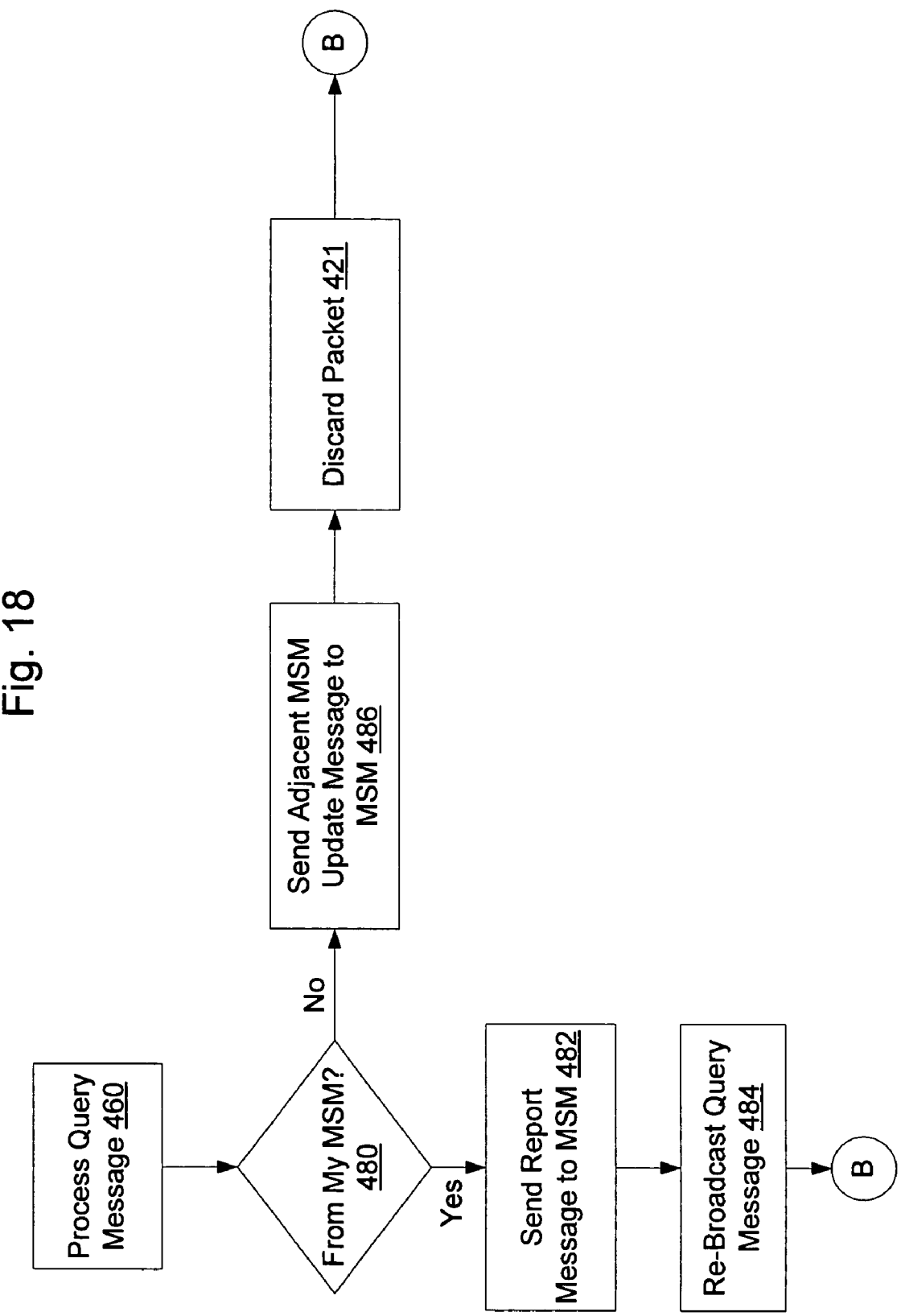
FIG. 18 is a flow diagram illustrating exemplary operations associated with processing of a query message at a regular node.

With reference to FIG. 18, exemplary operations associated with node processing of query messages received at communication device 70 are described. In an operation 480, device 70 determines if the query message was sent from its MSM. If the query message was sent from its MSM, a multicast session report message is sent to the MSM in an operation 482, the query message is re-broadcast in an operation 484, and processing continues at operation 138. If the query message was not sent from its MSM, an adjacent MSM update message is sent to its MSM in an operation 486, the packet is discarded in an operation 421, and processing continues at operation 138.

Figure 19:
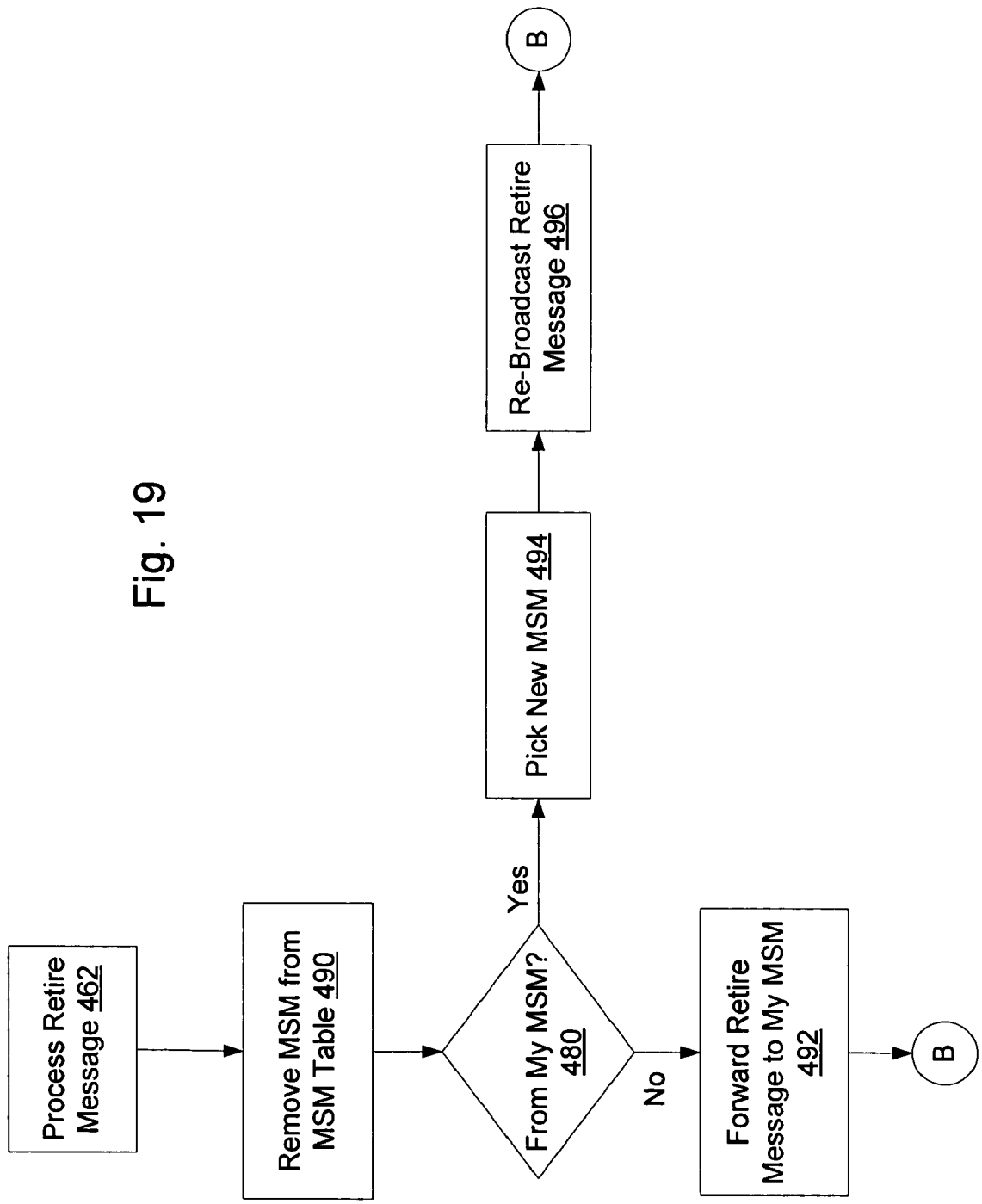
FIG. 19 is a flow diagram illustrating exemplary operations associated with processing of a "Retire" message at a regular node.

With reference to FIG. 19, exemplary operations associated with node processing of "Retire" messages received at communication device 70 are described. In an operation 490, the MSM that sent the "Retire" message is removed from the MSM table in an operation 490. The MSM table, for example, includes an MSM IP address associated with each MSM from which a query message is received, the number of hops to the MSM, and a timestamp indicating the time the most recent query message was received. The MSM table may be updated each time a node hears a query from an MSM. In an operation 480, device 70 determines if the "Retire" message was sent from its MSM. If the "Retire" message was sent from its MSM, a new MSM is selected in an operation 494, the "Retire" message is re-broadcast in an operation 496, and processing continues at operation 138. Selection of the new MSM is performed using an MSM selection algorithm that, for example, selects the closest MSM. If the "Retire" message was not sent from its MSM, the "Retire" message is forwarded to its MSM, and processing continues at operation 138.

Figure 20:
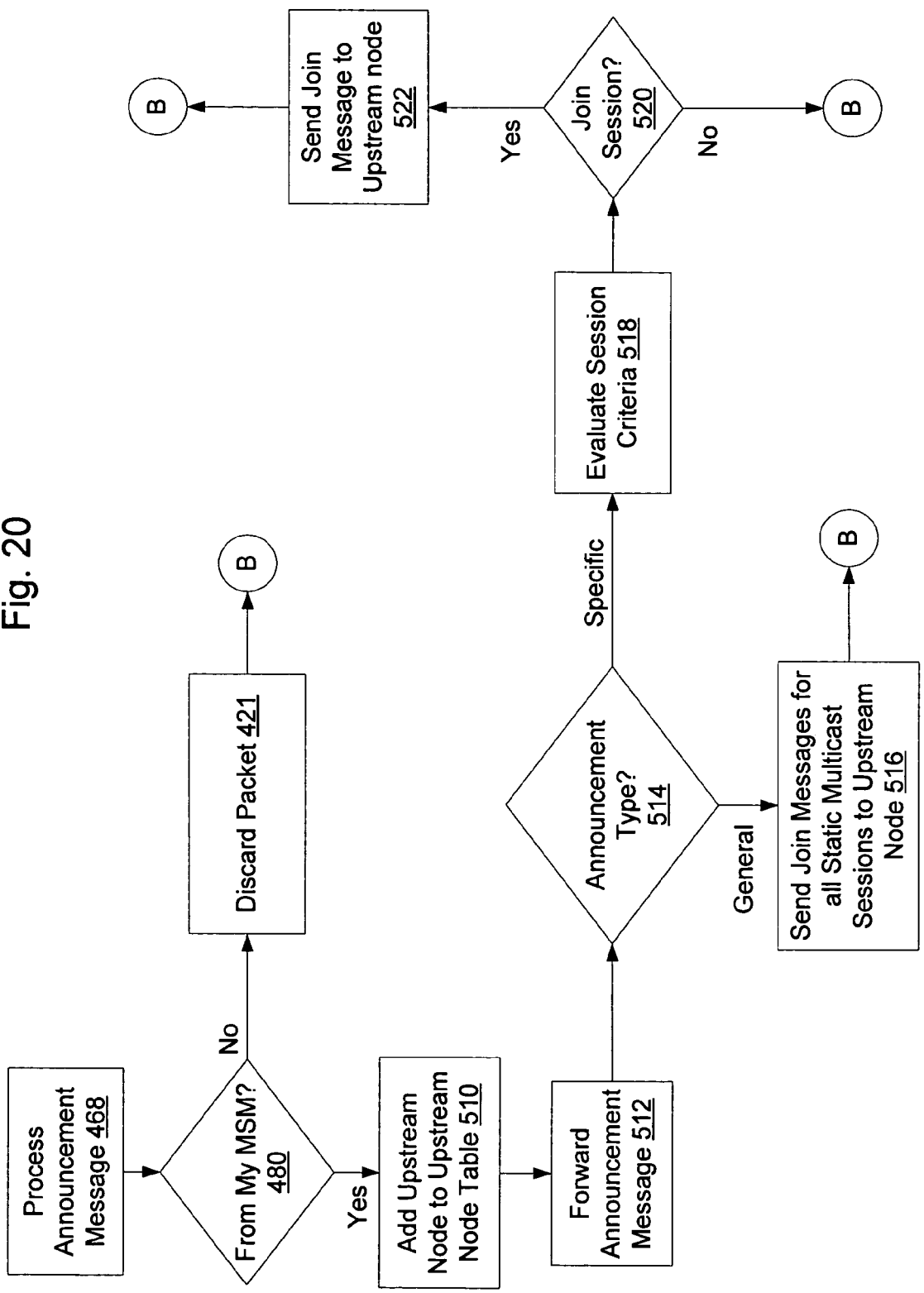
FIG. 20 is a flow diagram illustrating exemplary operations associated with processing of an announcement message at a regular node.

With reference to FIG. 20, exemplary operations associated with node processing of an announcement message received at communication device 70 are described. In an operation 480, device 70 determines if the announcement message was sent from its MSM. If the announcement message was not sent from its MSM, the packet is discarded in an operation 421, and processing continues at operation 138. If the announcement message was sent from its MSM, the upstream node is added to the upstream node table in an operation 510. The upstream node table, for example, includes a multicast session address, an upstream node address, and a sequence number of the most recently received packet. The upstream node table may be updated each time device 70 receives an announcement message from an MSM with a more recent sequence number than is currently saved in the table for that multicast session. In an operation 512, the announcement message is forwarded. In an operation 514, device 70 determines which type of announcement message was received. If the announcement message was a general announcement message, in an operation 516, a "Join" message for all static multicast sessions is sent to upstream nodes, and processing continues at operation 138. If the announcement message was a specific announcement message, in an operation 518, the session criteria is evaluated. In an operation 520, device 70 determines whether the dynamic multicast session should be joined based on the session criteria. If a determination is made not to join the dynamic multicast session, processing continues at operation 138. If a determination is made to join the dynamic multicast session, a "Join" message is sent to the upstream node, and processing continues at operation 138.

The "upstream" node is the first node to be heard transmitting the announcement to the receiving node. This designation also applies to MSMs. The general or specific multicast announcement is first heard by the receiving node from the upstream node. The general multicast announcement is a broadcast message, while the specific multicast announcement is a multicast message. Announcements are limited to the multicast domain of the MSM unless unicast between MSMs. A "Join" message is returned to the upstream forwarding node if the node is participating in the multicast session. As the "Join" message is forwarded to the MSM, it passes through the upstream forwarding node(s). This creates the path back to the MSM. This path is the most efficient path from the MSM, because the upstream forwarding node is the first forwarding node to be heard by the receiving node. As a result, the path from the MSM to the receiving node is the path having the least latency.

When a "New" node enters or a node reenters network 24, the node receives a multicast query from one or more MSMs. The node creates/updates the MSM table and selects the optimum MSM using an MSM selection algorithm. The node compiles a list of multicast sessions to be supported. The multicast session list is provided through a multicast membership report sent to its MSM as a unicast message. The "New" node unicasts a "Join" message to its MSM listing all of its multicast sessions. Each node in turn, between the "New" node and the receiving MSM, extracts the downstream node address from the unicast message and places the receiving interface and the downstream IP node address in their multicast forwarding table. Each node updates the multicast forwarding table and stores the downstream next hop node address for these multicast sessions. This process sets up the initial multicast session path to a "New" node's MSM. For "New" nodes that are joining the network for the first time, this path is setup for all static multicast sessions. For a node that is changing domains, the path setup is for all sessions that the node was actively participating in, static and dynamic.

Join criteria for the dynamic multicast sessions for "New" nodes are provided by their MSM in reply to a unicast request for information message from the "New" node. A unicast response is sent by the "New" node's MSM that covers all multicast sessions known by that MSM. MSMs keep information relating to all the dynamic multicast sessions for which they have received announcements in the session criteria table. This includes static multicast addresses, and associated dynamic multicast addresses, and their respective "Join" criteria. If the MSM is not a participant to the dynamic multicast session, the MSM will forward a unicast "Join" message to its upstream MSM for that dynamic multicast session after it receives a "Join" message from the "New" node. This downstream MSM-to-upstream MSM "Join" message builds the path from each participating downstream MSM to an MSM that is currently participating in the session. The upstream MSM is obtained from the upstream MSM table. The node's MSM provides the static and associated dynamic multicast session addresses with their respective "Join" criteria in the response message. With this information the "New" node can determine which dynamic multicast session(s) it will join by evaluating the "Join" criteria for the existing session(s).

A "Join" message is sent as a unicast message to the "New" node's MSM to join the dynamic multicast session. This node-to-MSM "Join" message builds the path from the "New" node to its MSM. Each "Join" message requires the MSM to update its session membership table to reflect the addition of the "New" node as a member of the session.

When a "New" MSM occurs within the network, it first creates the node-to-MSM paths as described in FIG. 7 within their multicast domain. Next, the "New" MSM creates MSM-to-MSM paths as described in FIG. 7. At the conclusion of developing the MSM-to-MSM paths, the "New" MSM has joined all of the static multicast sessions within network 24. The "New" MSM sends a unicast request for information message to the closest adjacent MSM, which sends a unicast response message back to the "New" MSM. The "New" MSM forms the dynamic multicast session paths.

Any node in network 24 can become mobile at any time. The mobile node can leave one multicast domain and move to another multicast domain. This requires the mobile node to be removed from the forwarding tables within the first multicast domain and to be added to the forwarding tables in the second multicast domain. It also requires the paths to be restructured or removed in the first multicast domain and for a new path to be added in the second multicast domain.

Updating of the forwarding tables is performed by table maintenance processes, which remove the mobile node from the first multicast domain. Paths are restructured and replenished by periodic announcements, which are followed by the "Join" messages from participating nodes. Nodes select which multicast domain they will become a member of by an algorithm that may be based on the number of hops to the each MSM. This process is performed by listening to the periodic query message sent out by each domain's MSM. A mobile node hears the periodic query message sent out by the MSM in the second multicast domain, and determines that now the second multicast domain's MSM is fewer hops away than the first domain's MSM. The mobile node selects the second multicast domain's MSM. At this time, the mobile node replies to the announcements from the second multicast domain's MSM. A "Join" message is sent to the second multicast domain's MSM and the path for multicast traffic is formed. The mobile node receives multicast message traffic from the second multicast domain's MSM. If the MSM is not already receiving multicast message traffic, then the MSM forwards a "Join" message to its upstream MSM for that multicast session and create the path for that multicast session.

There are numerous challenges to implementing multicast routing, particularly in a wireless Ad Hoc mobile network. Some of the challenges relate to mobility of the nodes. Nodes move from one domain to another domain. For example, sixth node 46 of second domain 40 shown in FIG. 2, may move to fourth domain 60. Additionally, new nodes may enter network 24 and nodes may leave network 24. All nodes in the multicast domain forward multicast traffic based on an interface basis. Multicast management application 80 executed at each node of network 24 provides efficient multicast routing across network 24. The multicast routing protocol thus established supports a wireless ad hoc mobile network.

The foregoing description of exemplary embodiments of the invention have been presented for purposes of illustration and of description. It is not intended to be exhaustive or to limit the invention to the precise form disclosed, and modifications and variations are possible in light of the above teachings or may be acquired from practice of the invention. For example, the multicast management application may include fewer, additional, or different modules than described and the sequence of operations may be varied without deviating from the spirit of the invention. The device also may be configured differently with different components and different connectivity between components. The embodiments were chosen and described in order to explain the principles of the invention and as practical applications of the invention to enable one skilled in the art to utilize the invention in various embodiments and with various modifications as suited to the particular use contemplated. All structural and functional equivalents to the elements of the above-described embodiments that are known to those of ordinary skill in the art both now and in the future are intended to be encompassed by the claims. Thus, it is intended that the scope of the invention be defined by the claims appended hereto and their equivalents both now and in the future.

What is claimed is:

1. A communication device for processing a request to establish a multicast session among a plurality of communication nodes, the communication device comprising:
   a receiver, the receiver receiving a communication signal from a first communication device, the communication signal including a setup multicast session request, the setup multicast session request including a criterion for joining a first multicast session;
   a computer-readable medium having computer-readable instructions stored thereon, the instructions comprising
      receiving the criterion for joining the first multicast session;
      identifying a first multicast session address and a second multicast session address using the criterion for joining the first multicast session, the first multicast session identified using the first multicast session address;
      identifying a responder device using the second multicast session address, wherein the responder device is a member of a second multicast session, the second multicast session identified using the second multicast session address; and
      sending a multicast session announcement to the identified responder device, the multicast session announcement including the first multicast session address, the second multicast session address, and the criterion for joining the first multicast session; and
   a processor, the processor coupled to the computer-readable medium and configured to execute the instructions.

2. The device of claim 1, wherein the communication device is a hub of a first multicast domain, and the responder device is a hub of a second multicast domain.

3. The device of claim 1, wherein the multicast session announcement is sent using a unicast transmission.

4. The device of claim 1, wherein the second multicast session is based on a pre-defined multicast session of the communication device.

5. The device of claim 1, wherein the instructions further comprise sending a second multicast session announcement to a second communication device, the second multicast session announcement including the first multicast session address, the second multicast session address, and the criterion for joining the first multicast session, the second communication device within a domain of the communication device.

6. The device of claim 5, wherein the second multicast session announcement is sent using a multicast transmission.

7. The device of claim 1, wherein identifying the responder device comprises identifying a plurality of responder devices, and further wherein the instructions further comprise creating a responder list, wherein the responder list includes the plurality of responder devices.

8. The device of claim 7, wherein the receiver receives a second communication signal, the second communication signal including a response from a third communication device, wherein the third communication device is one of the plurality of responder devices, the response indicating if the third communication device is joining the first multicast session.

9. The device of claim 8, wherein the instructions further comprise sending a message to the first communication device indicating that the first communication device can proceed with the first multicast session if the response indicates the third communication device is joining the first multicast session.

10. The device of claim 8, wherein the receiver receives a third communication signal, the third communication signal including a second response from the first communication device, wherein the instructions further comprise adding an address of the first communication device and the first multicast session address to a table if the response indicates the first communication device is joining the first multicast session.

11. The device of claim 8, wherein the instructions further comprise adding an address of the third communication device and the first multicast session address to a table if the response indicates the third communication device is joining the first multicast session.

12. The device of claim 8, wherein the instructions further comprise receiving the response and indicating that the third communication device has responded to the multicast session announcement.

13. The device of claim 12, wherein indicating that the third communication device has responded to the multicast session announcement comprises removing the third communication device from the responder list.

14. The device of claim 7, wherein the instructions further comprise calculating a response percentage, wherein the response percentage compares a first number indicating the number of the plurality of responder devices that have responded to the multicast session announcement to a second number indicating the number of the plurality of responder devices that have not responded to the multicast session announcement.

15. The device of claim 14, wherein the instructions further comprise sending a message to the first communication device indicating that the first communication device can proceed with the first multicast session if the response percentage is greater than or equal to a minimum response percentage.

16. The device of claim 14, wherein the instructions further comprise sending a message to the first communication device indicating that the first communication device can not proceed with the first multicast session if the response percentage is less than or equal to a minimum response percentage.

17. The device of claim 1, wherein the instructions further comprise receiving an internal interrupt, wherein the internal interrupt is triggered by a timer, the timer indicating expiration of a time period for receiving a response from the responder device.

18. The device of claim 17, wherein the instructions further comprise:
   incrementing an attempt counter after receiving the internal interrupt, wherein the attempt counter indicates the number of times that the multicast session announcement is sent;
   comparing the attempt counter to a maximum attempt counter; and sending the multicast session announcement again if the attempt counter is not greater than the maximum attempt counter.

19. A method of distributing data in a network, wherein the network includes a plurality of nodes and at least a portion of the plurality of nodes form a multicast group, the method comprising:
    receiving a communication signal from a first communication device, the communication signal including a setup multicast session request, the setup multicast session request including a criterion for joining a first multicast session;
    identifying a first multicast session address and a second multicast session address using the criterion for joining the first multicast session, the first multicast session identified using the first multicast session address;
    identifying a responder device using the second multicast session address, wherein the responder device is a member of a second multicast session, the second multicast session identified with the second multicast session address; and
    sending a multicast session announcement to the identified responder device, the multicast session announcement including the first multicast session address, the second multicast session address, and the criterion for joining the first multicast session.

20. A communication system, the communication system comprising:
    a first communication device, the first communication device including
        a first computer-readable medium having first computer-readable instructions stored thereon, the first instructions comprising
            receiving a first request for a first multicast session from a multicasting application;
            receiving a criterion for joining the first multicast session from a multicasting application; and
            preparing a second request, the second request including a unicast address of a manager device and the received criterion;
        a transmitter, the transmitter sending the second request to a manager device;
        a first processor, the first processor coupled to the first computer-readable medium and configured to execute the first instructions; and
    the manager device including
        a receiver, the receiver receiving received criterion from the first communication device;
        a second computer-readable medium having second computer-readable instructions stored thereon, the second instructions comprising receiving the received criterion;
            identifying a first multicast session address and a second multicast session address using the received criterion for joining the first multicast session, the first multicast session identified using the first multicast session address, and a second multicast session identified using the second multicast session address;
            identifying a responder device using the second multicast session address, wherein the responder device is a member of the second multicast session; and
            sending a multicast session announcement to the identified responder device, the multicast session announcement including the first multicast session address, the identified second multicast session address, and the received criterion; and
        a second processor, the second processor coupled to the second computer-readable medium and configured to execute the second instructions.

* * * * *